United States Patent
Garwood

(10) Patent No.: US 8,101,220 B2
(45) Date of Patent: Jan. 24, 2012

(54) TREATMENT TO REDUCE MICROORGANISMS WITH CARBON DIOXIDE BY MULTIPLE PRESSURE OSCILLATIONS

(75) Inventor: Anthony J. M. Garwood, Mercer Island, WA (US)

(73) Assignee: SafeFresh Technologies, LLC, Mercer Islands, WA (US)

( * ) Notice: Subject to any disclaimer, the term of this patent is extended or adjusted under 35 U.S.C. 154(b) by 0 days.

(21) Appl. No.: 12/627,931

(22) Filed: Nov. 30, 2009

(65) Prior Publication Data

US 2010/0075002 A1 Mar. 25, 2010

Related U.S. Application Data

(63) Continuation of application No. 11/314,198, filed on Dec. 21, 2005, now abandoned.

(60) Provisional application No. 60/637,915, filed on Dec. 21, 2004.

(51) Int. Cl.
*A21D 6/00* (2006.01)

(52) U.S. Cl. .................... 426/238; 426/236; 426/237

(58) Field of Classification Search .................. 426/238, 426/237, 236
See application file for complete search history.

(56) References Cited

U.S. PATENT DOCUMENTS

| 3,673,698 | A | * | 7/1972 | Guerard | ............................ 34/284 |
| 6,143,087 | A | * | 11/2000 | Walter | ............................... 134/1 |
| 2004/0146602 | A1 | | 7/2004 | Garwood | |
| 2005/0042346 | A1 | | 2/2005 | Garwood | |
| 2005/0260311 | A1 | | 11/2005 | Garwood | |

FOREIGN PATENT DOCUMENTS

| WO | 2005099482 A2 | 10/2005 |
| WO | 2006060596 A2 | 6/2006 |

OTHER PUBLICATIONS

Angela K. Dillow, Department of Chemical Engineering and Materials Science, University of Minnesota, Minneapolis, MN 5; Bacterial inactivation by using near- and supercritical carbon dioxide; Proc. Natl. Acad. Sci. USA; vol. 96, pp. 10344-10348, Aug. 1999; Medical Sciences.*
Dillow, A.K., et al., "Bacterial Inactivation by Using Near- and Supercritical Carbon Dioxide," Proc. Natl. Acad. Sci 96 (18):10344-10348, Aug. 31, 1999.
Martin, J.D., et al., "Effects of Carbon Dioxide on Bacterial Growth Parameters in Milk as Measured by Conductivity," J. Dairy Sci. 86(6):1932-1940, Jun. 2003.
Spilimbergo, S. and A. Bertucco, "Non-Thermal Bacteria Inactivation With Dense CO2," Biotechnology and Bioengineering 84(6):627-638, Dec. 20, 2003.

* cited by examiner

Primary Examiner — Humera Sheikh
Assistant Examiner — Patricia George
(74) Attorney, Agent, or Firm — Christensen O'Connor Johnson Kindness PLLC

(57) ABSTRACT

Apparatus and methods to non-thermally treat goods for human consumption with carbon dioxide. Apparatus and methods rely on multiple pressure changes of carbon dioxide to affect one of three processes. A first process rapidly freezes and thaws water on the surface of the goods in rapid succession multiple times to detrimentally affect pathogens. A second process raises the pressure and temperature of carbon dioxide to supercritical conditions to detrimentally affect the lipids in the membranes of pathogens. A third process adjusts the pressure to form a dense carbon dioxide liquid with a low pH that may also detrimentally affect pathogens. All processes may be repeated or performed in succession, or in any order. Optionally, thereafter, the goods may be stored at low temperature in substantially 100% carbon dioxide for further pathogen reduction.

13 Claims, 8 Drawing Sheets

TREATMENT TO REDUCE MICROORGANISMS WITH CARBON DIOXIDE BY MULTIPLE PRESSURE OSCILLATIONS

This application is a continuation of U.S. application Ser. No. 11/314,198, filed Dec. 21, 2005, currently abandoned, which claims the benefit of Provisional Application No. 60/637,915, filed on Dec. 21, 2004, both of which applications are fully incorporated herein expressly by reference.

FIELD OF THE INVENTION

The present invention is related to apparatus for the treatment of meat using carbon dioxide and to methods of treating meat using carbon dioxide.

BACKGROUND

Carbon dioxide has been used to kill microorganisms non-thermally, meaning that the mechanism through which such microorganisms are killed is not dependent on a high temperature. However, the methods using carbon dioxide are static methods, since after the conditions of the carbon dioxide were set, the conditions were held for a period of time to affect the microorganisms. Thereafter, the treatment was stopped. Supercritical conditions, where carbon dioxide exists only as a supercritical fluid, have also been tried. These methods, too, were static, meaning that once the conditions were set, the carbon dioxide was allowed to affect the microorganisms, and then, the carbon dioxide treatment was stopped. While such treatments did achieve some reduction in microorganisms, there is still much to learn in the way of using carbon dioxide to reduce microorganisms.

SUMMARY

To solve the aforementioned problems and/or improve on the prior art, the present invention proposes new methods and the apparatus for the treatment of food using carbon dioxide, wherein the carbon dioxide conditions are changed. The present methods for using carbon dioxide as an antimicrobial are carried out in the sub-supercritical phase or, alternatively, oscillating between supercritical phase and sub-supercritical phase, and also include rapid pressure drop (RPD) and/or phase change of carbon dioxide to induce ice crystal formation. For example, a method in accordance with one embodiment of the present invention can begin by treatment of food with carbon dioxide at such pressure and temperature that when the pressure is reduced in a controlled manner, the resultant drop in temperature will form ice crystals that detrimentally affect microorganisms on the surface of the food. This treatment can then be followed with an increase in pressure and temperature of the carbon dioxide up to or in excess of the supercritical pressure and supercritical temperature to result in a supercritical carbon dioxide fluid that further detrimentally affects the already detrimentally affected microorganisms that have been injured or damaged by the prior treatment. The carbon dioxide pressure can then be reduced to a pressure below the supercritical pressure, such that the carbon dioxide is a dense fluid that has a pH in the range of 2 to 4 to further detrimentally affect the already detrimentally affected microorganisms. In this tripartite method, anyone of the carbon dioxide treatments can be repeated or sequenced in any order, or the entire tripartite sequence can be repeated.

The present invention provides a reliable, reproducible, and effective antimicrobial process for the reduction of pathogens, such as *E. coli* 0157:H7, that can be present with goods intended for human consumption. Such food includes meat, such as ground beef. The present process provides a low-cost procedure that uses a solid, liquid, and/or gas agent, such as carbon dioxide.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Disclosed are the apparatus and methods to non-thermally treat goods for human consumption with carbon dioxide. Inactivation of microorganisms, including pathogens, relies on treating goods for human consumption with carbon dioxide, wherein the carbon dioxide undergoes multiple pressure changes to affect one of three processes. A first process rapidly freezes and thaws water on the surface of the goods in rapid succession multiple times to detrimentally affect pathogens. A second process raises the pressure and temperature of carbon dioxide to supercritical conditions to detrimentally affect the lipids in the membranes of microorganisms. A third process adjusts the pressure to form a dense carbon dioxide liquid with a low pH that may also detrimentally affect microorganisms. All processes may be repeated or performed in succession, or in any order. Optionally, thereafter, the goods may be stored at low temperature in substantially 100% carbon dioxide for further microorganism reduction.

Figure 1:
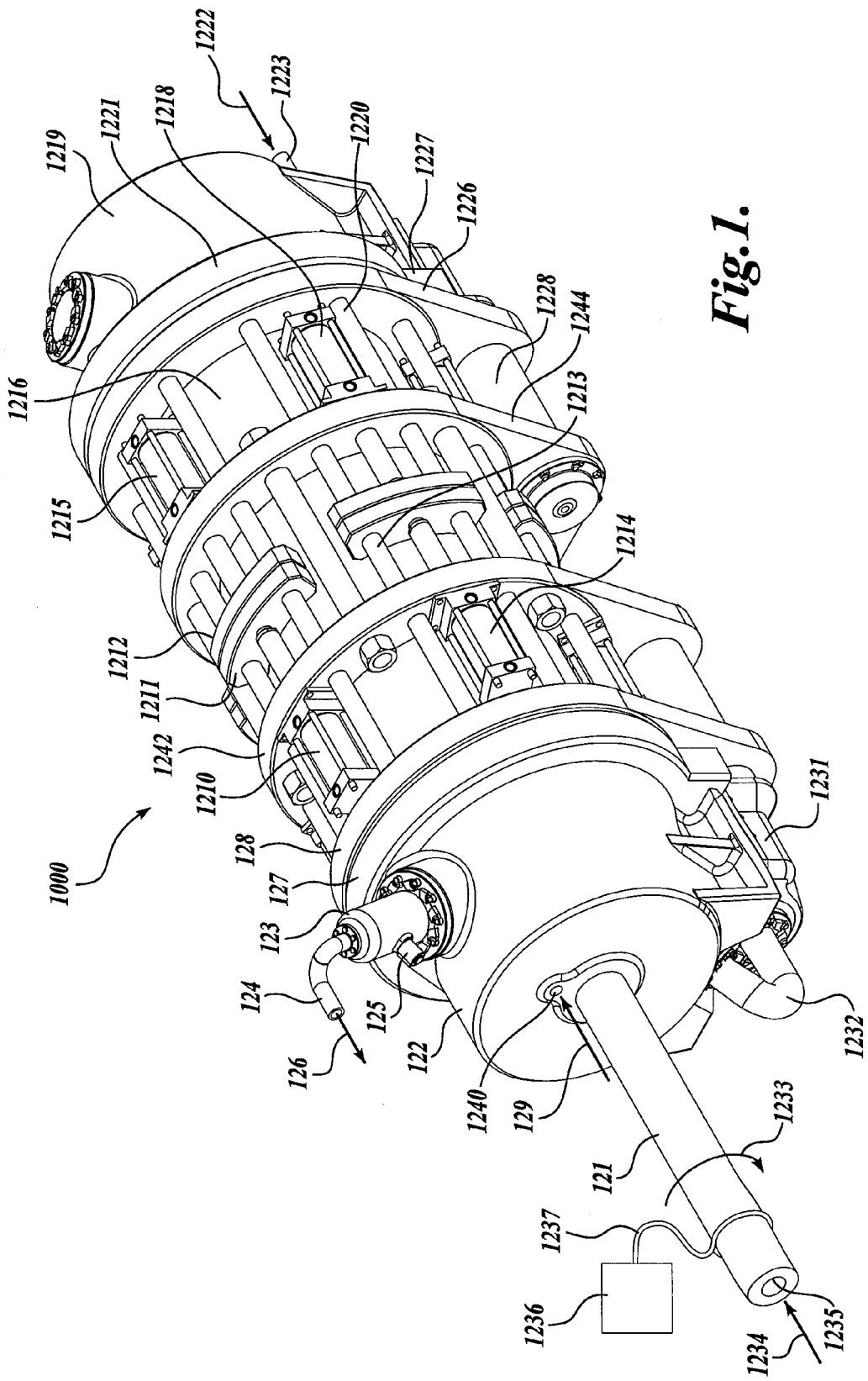
FIG. 1 is an illustration of one embodiment of an apparatus according to the present invention.
Figure 2:
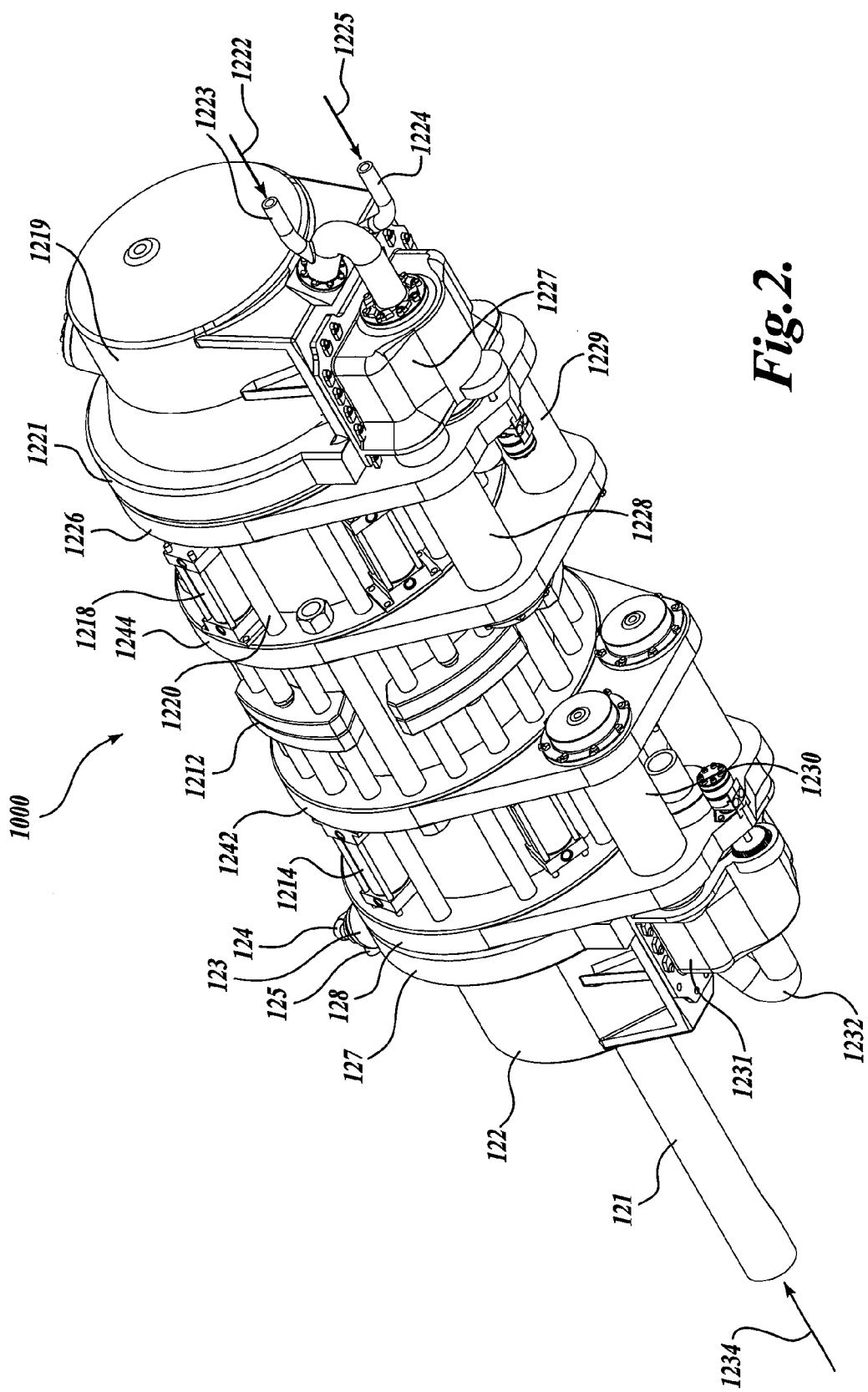
FIG. 2 is an illustration of one embodiment of an apparatus according to the present invention.

FIGS. 1 and 2 are illustrations of an apparatus 1000 for the treatment of food, including meat, using carbon dioxide. The apparatus is arranged in a horizontal disposition and includes a cylinder 1216 capped on both ends to enable pressurizing a chamber within the cylinder 1216 in a controlled manner. The cylinder 1216 includes a first end cap 122 enclosing one end of the cylinder 1216, and a second end cap 1219 enclosing the other, opposite end of cylinder 1216. The cylinder 1216 and end caps 122 and 1219 are held together by a series of shafts, such as shafts 1213 and 1220 with hydraulic cylinders 1210, 1215, 1214, and 1218 (the operation of which is described below), which are in turn mounted to annular rings 1242 and 1244 in such a manner that the cylinder 1216 is sealed hermetically to end caps 122 and 1219. The cylinder 1216 with end caps 122 and 1219 encloses a space in which goods, such as boneless beef or any meat or other food product, can be transferred therein by way of inlet conduits and outlet conduits. A first positive displacement pump 1227 is located adjacent to end cap 1219, which delivers product into cylinder 1216 at an elevated pressure. A second positive displacement pump 1231 is located adjacent to and mounted rigidly to end cap 122 to extract the food product, such as boneless beef, after processing, from within cylinder 1216, and in such a manner that will enable the retention of the pressure within cylinder 1216. Positive displacement pumps 1231 and 1227 can deliver pressure in a range up to 2500 psig. Positive displacement pump 1227 is attached to a pair of cylinders 1229 and 1228 (best seen in FIG. 2), which are mounted rigidly to annular rings 1244 and 1226 located around the outer circumference of cylinder 1216. Food, such as boneless beef, intended for processing within the apparatus shown in FIG. 1 can be delivered to pump 1227 with any primary positive displacement pump, such as can be supplied by Marlen, or alternatively by Handtmann, directly from a container, such as a conical hopper wherein boneless beef is deposited in the hopper (not shown) at atmospheric pressure. Alternatively, any gas selected for its shelf life enhancing properties, such as carbon dioxide, can be provided in the hopper so as to minimize atmospheric air that would otherwise contact the meat or other food products in the hopper. The food product, such as boneless beef, preferably will have been refrigerated and maintained at a low temperature, such as 32 degrees F. or lower, and up to 45 degrees F. The food product can be pumped by a primary pump to positive displacement pump 1227 at a controlled mass flow rate and arranged to match the flow rate of the food product pumped by positive displacement pump 1231. The pressure of the stream of food product pumped to positive displacement pump 1227 may be in the order of 100 psi, wherein the food product is transferred at such pressure through a stainless steel pipe. The stainless steel pipe may be equipped to measure the fat and water content of the food product. In one representative example, beef is transferred into the processing space within cylinder 1216 at an elevated pressure, such as up to 2500 psi. The mass flow rate of the boneless beef pumped from the primary pump to positive displacement pump 1227 is measured and controlled, such as at a mass flow rate of 150 pounds per minute. The apparatus 1000 includes the conduits 1223 and 1224 (best seen in FIG. 2), which lead into the processing space within cylinder 1216.

Conduits 1223 and 1224 are arranged to enable combining measured quantities of carbon dioxide, most preferably in a liquid or dense phase, at a mass flow rate corresponding to the mass flow rate of the boneless beef or any ratio thereof, wherein the carbon dioxide is transferred into the cylinder 1216 via conduit 1223 in the direction shown by arrow 1222. Additionally a measured quantity of water at any ratio of the incoming boneless beef can be transferred into the cylinder 1216 via conduit 1224 in the direction shown by arrow 1225. In one embodiment, carbon dioxide, water, and the boneless beef are combined together in quantities controlled according to such proportions that the quantity of water is about equal to an amount of water that previously has, or subsequently will, evaporate and, in so doing, be lost at a rate that is equal to the amount combined with the boneless beef. However, an amount of water equal to about 0.49 percent of the boneless beef can be retained with the boneless beef after processing. Furthermore, the quantity of carbon dioxide delivered into cylinder 1216 with the water and the boneless beef is such that subsequent pressure reduction produces the required amount of chilling of the boneless beef as herein described. The chilling process, enabled by evaporation of the carbon dioxide, will cause the temperature of the boneless beef to be reduced to a low temperature.

Positive displacement pump 1227 and cylinders 1229 and 1228 attached thereto are arranged such that each cylinder will fill with boneless beef while the other cylinder is emptying, and in an alternating sequential operation, such that a substantially continuous flow of boneless beef will be transferred, with, or alternatively without, water and carbon dioxide combined therewith, into the cylinder 1216. The positive displacement pump 1231, with a pair of cylinders, such as 1230 and the other not shown, are arranged to operate similarly, and in an alternating sequential operation, however, to remove material from within cylinder 1216 via conduit 1232.

The cylinder 1216 includes a centrally disposed shaft 121 at one end thereof. The shaft 121 is provided as shown centrally disposed and retained by end cap 122. Shaft 121 is arranged to rotate such as in the direction shown by arrow 1233. Shaft 121 may also be arranged to be driven in a reciprocating action longitudinally, firstly in a direction shown by arrow 129, and then in a direction opposite to arrow 129. The reciprocating action combined with rotating motion can be varied to mix the contents within the processing space of cylinder 1216. Shaft 121 can have a centrally disposed conduit 1235, which enables the transfer of any agent, such as carbon dioxide there through and in the direction shown by arrow 1234. The mass flow rate of transfer of the carbon dioxide through conduit 1235 can be arranged to correspond with the extraction of carbon dioxide via conduit 124 from within cylinder 1216. Conduit 124 is attached directly to and sealed in a gas tight fashion to bell housing 123. Bell housing 123 is fixed in a gas tight manner directly to end cap 122 and is further located at an uppermost location, such that carbon dioxide being lighter than boneless beef and water, can accumulate within bell housing 123. After accumulation in bell housing 123, carbon dioxide can be transferred through conduit 124 in the direction shown by arrow 126.

The flange portion 127 of end cap 122 is arranged to mate with cylinder 1216 adjacent to the retention ring 128 in such a manner that the end cap 122 and cylinder form a gas tight seal. A port 1240 is provided in the end cap 122 such that a pressurized fluid, such as water, can be transferred there through in the direction shown by arrow 129. Pressurized water transferred through port 1240 can be extracted through the same port 1240. End cap 1219 is fitted with a port similar to 1240, but which cannot be seen in FIG. 1. The operation and significance of ports to allow water at the end caps will become apparent from the description below. Water is preferably used in any hydraulic piston arrangement, not only for its availability and economy, but also because should the fluid leak into the cylinder 1216 containing product, water is compatible with goods for human consumption. Alternatively, any other liquid compatible with goods for human consumption may be used, such as a mixture of ethanol and water.

An ultrasonic generator 1236 is shown with cable 1237 that is attached to shaft 121. Ultrasonic generator 1236 may be supplied by Branson. Ultrasonic generator 1236 provides ultrasonic energy that will dissipate into boneless beef within the treatment chamber of cylinder 1216. It is believed that such ultrasonic energy will cause separation of any groups of pathogenic cells from the boneless beef surfaces, thereby increasing the contact of the cells with the treatment agent within cylinder 1216. Ultrasonic energy may have a selectable cycle rate of from 10,000 cycles to 100,000 cycles, but preferably, and if need be, outside of such range, and at any cycle rate that will result in effective separation of cells. Such pathogens can include *E. coli* 0157:H7, *salmonella* or *listeria*

*monocytogenes*. Such agent may be carbon dioxide in any phase, such as a dense liquid, supercritical, or sub-supercritical.

A proximity switch 125 is attached to bell housing 123 to determine the density of any matter contained within bell housing 123. The purpose of proximity switch 123 is to determine whether matter other than carbon dioxide is present within the bell housing 123. In the event that it is determined that boneless beef has entered the bell housing 123, the extraction of carbon dioxide through conduit 124 can be reduced or stopped. Given that the density of boneless beef will be substantially greater than the carbon dioxide, it is most probable that carbon dioxide will "float" and tend to accumulate at the upper end of bell housing 123, and boneless beef will accumulate at the lower end or below the bell housing 123. Therefore, the arrangement proposed herein where bell housing 123 is attached to the uppermost region of end cap 122, results in the removal of carbon dioxide from within the cylinder 1216 without significant quantities of boneless beef being carried therewith. Carbon dioxide extracted in the manner described above can be transferred to a compressor (not shown). After compression, which may require filtering prior to compression, carbon dioxide can be transferred from the compressor, and if necessary through a heat exchanger to enable the adjustment of the temperature of the carbon dioxide, and then into a holding vessel (not shown) for storage prior to subsequent use or alternatively directly to conduit 1235, and then into cylinder 1216.

Figure 3:
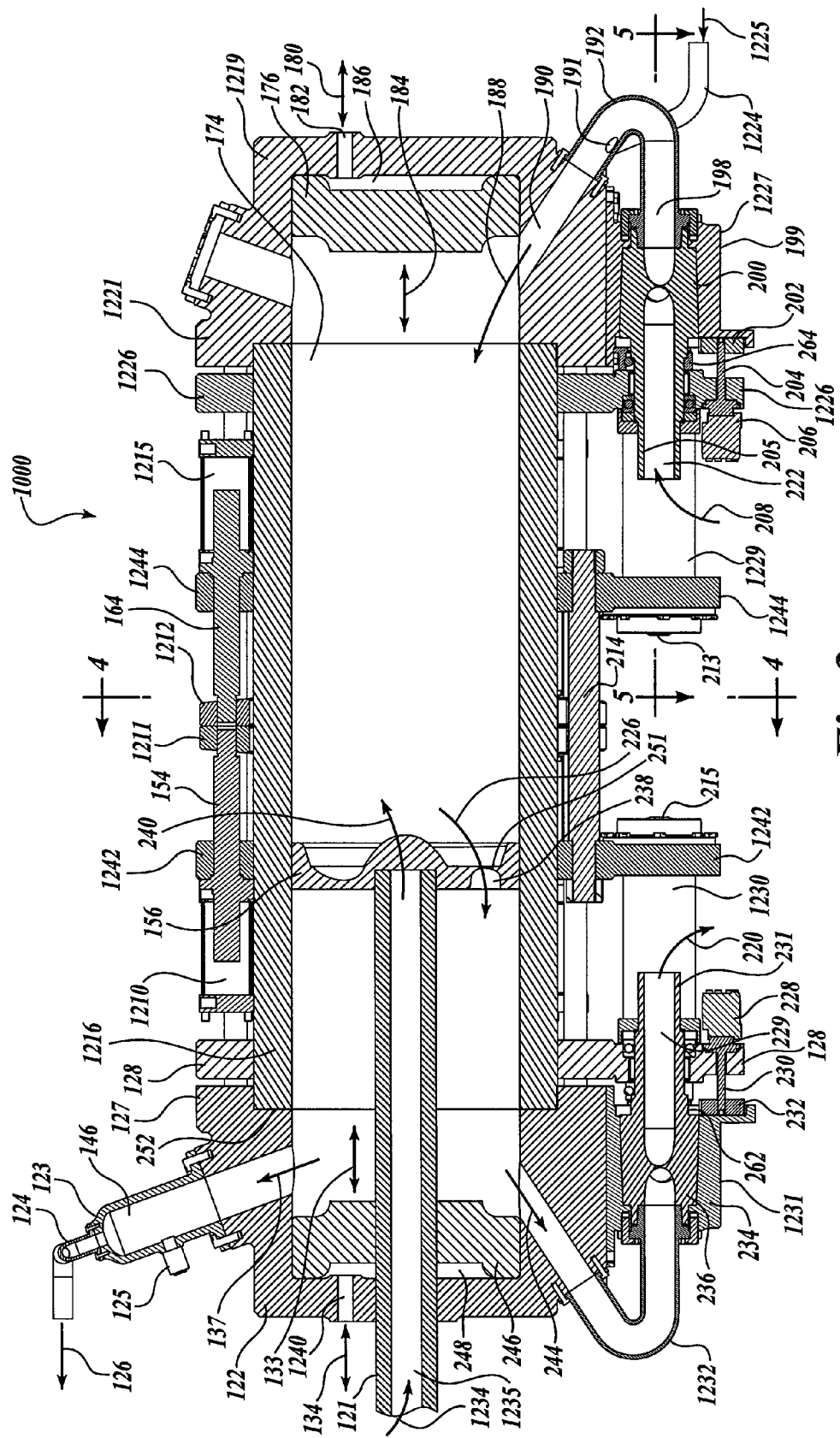
FIG. 3 is a cross section illustration of one embodiment of an apparatus according to the present invention.

Referring now to FIG. 3, a cross section illustration of the apparatus 1000 shown in FIG. 1 is provided. The horizontally disposed cylinder 1216 is arranged with the first end cap 122 enclosing one end, and the second end cap 1219 enclosing the opposite end, thereby providing an enclosed space 174. The inner diameters of the first end cap 122, the second end cap 1219, and the cylinder 1216 are profiled to provide a smooth inner bore. A piston 246 is profiled to fit within the inner diameter of the end cap 122. Piston 246 may be manufactured from any suitable material such a stainless steel or, alternatively, a polymer, such as a polypropylene or other suitable plastic, such as U.H.M.W.L.D.P.E. Piston 246 has a circular profile which mates with the matching internal profile of the end cap 122 and cylinder 1216. Piston 246 is fitted with seals around its periphery, such that the seals are in direct contact with the internal surface of end cap 122 and cylinder 1216, and in such a manner that a pressure tight seal is provided between piston 246, end cap 122, and correspondingly cylinder 1216. A pressure tight seal is also provided between the centrally disposed bore of piston 246 and the outer surface of the shaft 121. Piston 246 is arranged in such a manner that it can travel in both directions shown by double-headed arrow 133. Such travel is induced by introducing or withdrawing a fluid, such as water, through port 1240 and into space 248. Pressurized water introduced into or withdrawn from space 248 causes piston 246 to reciprocate, thereby alternately reducing and expanding the volume of space 174 and by consequence the pressure, as well. The reciprocating action of piston 246 can, therefore, cause sequential compression and decompression of goods within space 174. Furthermore, piston 246 can be reciprocated in such a manner and at any reciprocating cycle rate, thereby oscillating the pressure in space 174. Oscillation of piston 246 can be arranged to operate at any cycle rate, such as several cycles per second or as few as one cycle per second. Shaft 121 with conduit 1235 provided therein is arranged in a horizontal position and generally parallel with cylinder 1216, and attached to a piston like member 156 at an end of shaft 121 in the interior of space 174. Shaft 121 and piston like member 156 are attached together and rigidly fixed such that both shaft 121 and member 156 can be rotated or reciprocated in opposing directions shown by arrow 133. Suitable motors which may be hydraulically driven or alternatively electric, are attached via a transmission arrangement to shaft 121 and in such a manner that will enable a controlled and variable reciprocation of piston 156 and shaft 121 in both directions. Drive motors enabling reciprocation of shaft 121 and piston 156 have not been shown but can be readily provided and mounted to the apparatus shown in FIG. 3. Conduit 1235 is provided to enable the transfer of any selected agent, such as carbon dioxide, suitably pressurized, in the direction shown by arrows 1234 and 240. Perforations 163 (best seen in FIG. 6) located in piston 156 provide direct communication from conduit 1235 to space 174 to enable the controlled transfer of agent, such as carbon dioxide, and in a manner such that when the carbon dioxide enters space 174, it will mix readily with beef located in space 174. Carbon dioxide transferred into space 174 via conduit 1235 can be sourced from storage or recycled from port 124, after having been treated and compressed. Piston member 156 has a peripheral surface having a circular profile that is parallel with the inner surface of cylinder 1216. Seals can be provided between the outer edge of piston member 156 and the adjacent inner surface of cylinder 1216, and in such a manner that will allow piston member 156 to slide in either direction shown by arrow 133 efficiently. Piston member 156 is rigidly attached to shaft member 121, such that when shaft member 121 is rotated or reciprocated, piston member 156 will also rotate and reciprocate. Piston member 156 can be rotated and reciprocated in an oscillating movement so as to provide an effective mixing action to the contents retained under pressure within space 174. Piston member 156 is arranged with an opening 238 with edge 251 (best seen in FIG. 6) so as to allow the passage of goods there through. A more detailed description of opening 238 will be provided below, preferably the opening 238 will have an elongated elliptical profile arranged in an arc approximately centered about the horizontal axis of shaft 121. Goods, such as boneless beef, retained under pressure in space 174 can, therefore, be transferred in the direction shown by arrow 226 through opening 238, and alternately, through the same opening 238 in a direction opposite to arrow 226, according to the reciprocating movement of piston member 156.

Figure 5:
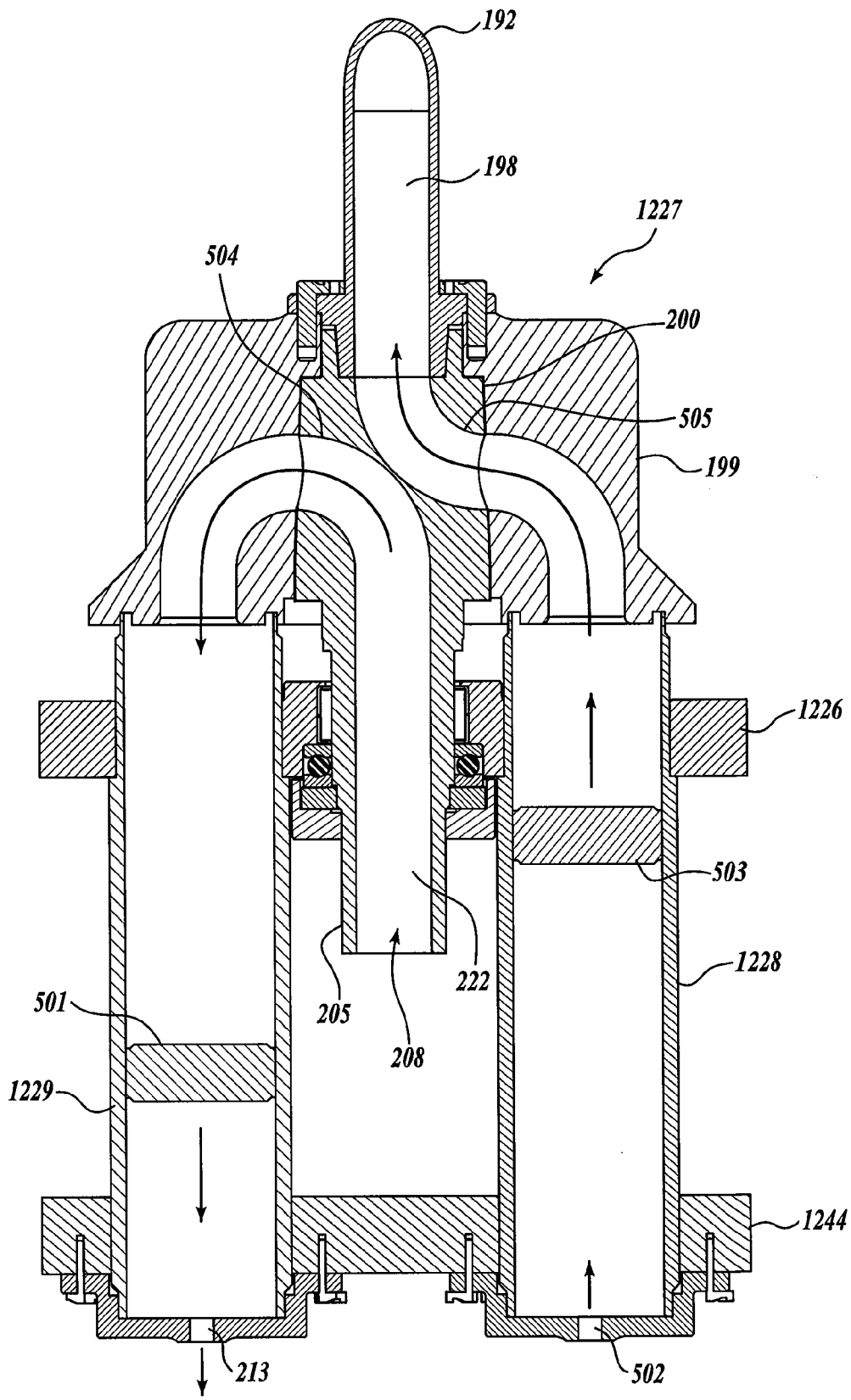
FIG. 5 is a cross section illustration of one embodiment of an apparatus according to the present invention.

Positive displacement pump 1227 (best seen in FIG. 5) with housing 199 and internally mounted cone 200, is mounted to end cap 1219 so as to allow the transfer and pressurizing of goods, such as boneless beef, in the direction shown by arrow 208 and 188, via conduit 205, along path 222 and then after being suitably pressurized by either one of two cylinders, such as 1228 or 1229, is pumped through space 198 along conduit 192 and space 190, in the direction shown by arrow 188. Positive displacement pump housing 199 is mounted directly to end cap 1219 and cone 200 is attached via suitable bearings to a ring member 1226. Cylinders 1228 and 1229 are attached by rigid mounting fixtures to ring members 1226 and 1244. A hydraulic motor 206 (seen in FIG. 3) is arranged with drive shaft 204 attached rigidly to spur gear 202, which in turn engages with ring gear 264 rigidly fixed to cone member 200. Hydraulic motor 206 provides a driving force transferred via shaft 204 to spur gear 202, such that when activated, ring gear 264 is rotated at a selected speed. In this way, goods are transferred from a primary pump in the direction shown by arrow 208 through space 222 in conduit 205 via rotating cone 200 and into cylinder 1229. A matching piston member 501 is provided within cylinder 1229 in such a way that when goods, such as boneless beef, are transferred into cylinder 1229, the matching piston member 501 provided therein is subjected to sufficient pressure that will cause it to slide a distance corresponding with the quantity of boneless beef transferred into cylinder 1229 and in a direction toward an aperture 213. Pressurized water is provided at a selected pressure through aperture 213 and at such a pressure that will exert a force onto the surface of matching piston 501 within cylinder 1229, such that the force provided by the pressurized water onto the matching piston 501, is less than the force exerted onto the opposite surface of the piston 501 within cylinder 1229, thereby allowing a steady movement of the piston 501 correspondingly causing pressurized water to be expelled at a steady rate through port 213. Boneless beef transferred into cylinder 1229 in this manner can fill the available space within cylinder 1229. When cylinder 1229 has been filled by a known quantity of boneless beef, cone member 200 can be rotated to a position that closes the communication between space 222 and the internal space of cylinder 1229. When cone member 200 rotates in such a manner as to close communication between space 222 and cylinder 1229, a port also located in cone 200 can then subsequently provide direct communication between the internal space of cylinder 1229 and space 198. At this time, pressurized water with sufficient volume, having a pressure approximately equal to the pressure of goods within spaces 174, 190, and 198, can drive the matching piston 501 in cylinder 1229, thereby transferring the boneless beef within cylinder 1229 into space 198 and through conduit 192. As seen in FIG. 5, cone member 200 is positioned to allow the transfer of beef through conduit 205 into space 222 and into cylinder 1229, via port 504 in cone 200. Therefore, piston 501 is being pushed toward opening 213 and expelling water through opening 213. Simultaneously, or sequentially, water is being pumped through port 502 in cylinder 1228 to push piston 503 toward the port 505 in cone member 200. Pressurized water provided to achieve the driving force sufficient to fill and empty boneless beef from cylinders 1228 and 1229 is provided through ports 213 and 502 with a flow controlling valve (not shown) to provide the control needed. Cone member 200 can be driven in a rotating motion by hydraulic pump 206, which may alternatively be an electric motor, in a continuous or, alternatively, intermittent, motion. This rotating intermittent motion can allow the transfer of boneless beef at a first, low pressure into either cylinder 1228 or 1229 and then at a second, higher pressure, into space 198 and through conduit 192. After the boneless beef has been transferred from either cylinder 1228 or 1229 into conduit 192, the empty cylinder with a matching piston can be filled with boneless beef while emptying the filled cylinder. In this way, boneless beef can be transferred into either one of two cylinders with matching pistons to enable a substantially constant and known mass flow of boneless beef in apparatus 1000. Water and carbon dioxide in quantities proportional or at any ratio to the mass flow of boneless beef, can be simultaneously transferred into space 174 via conduits, such as 1224 in the direction shown by arrow 1225, through port 191 communicating directly with conduit 192. In this way, boneless beef, water, and carbon dioxide, can mix together in space 190, immediately prior to direct transfer into space 174.

End cap members 1219 and 122 are arranged to mate with cylinder 1216 in a pressure tight, fluid and gas tight manner (best seen in FIG. 3). Piston 246 is provided at the end cap 122. Piston 176 is provided at the end cap 1219. Port 182 communicating with space 186, enables the transfer of a pressurized fluid, such as water, in directions shown by double headed arrow 180 that will provide a reciprocating movement of piston 176 in a manner similar to and corresponding with the movements described herein above in association with piston member 246. At the opposite end of cylinder 1216, port 1240 communicates with space 248 to enable the transfer of a pressurized fluid, such as water, in directions shown by double headed arrow 134. It can, therefore, be appreciated that piston members 246 and 176 are arranged in a horizontally opposed alignment within the internal surfaces of end caps 122 and 1219, respectively, and mate with the internal surface of cylinder 1216 in such a way that each piston 246, 176 can be moved along a horizontal path within the limits defined by each end cap and piston member 156, located between piston member 246 and piston member 176. Goods transferred into space 174 under pressure via conduit 192, can be further exposed to an oscillating pressure created by the horizontally opposed movement and corresponding compression of piston members 246 and 176. Piston member 176 will be subjected to pressurized fluid injected into space 186 via port 182, at such a pressure and rate of transfer as to cause piston member 176 to move toward piston member 156. Simultaneously, pressurized fluid injected into space 248 via port 1240, at a pressure corresponding with the pressure of fluid provided into space 186, will move piston member 246 simultaneously toward piston member 156. During this sequence wherein piston members 246 and 176 move toward each other, the pressure of goods, carbon dioxide, and water retained within space 174, will increase. Pressure within the cylinder 1216 can be controlled by the controlled movement of pistons 246 and 176. Pressure within cylinder 1216 may be elevated to, for example, from 0 psig up to 5000 psig, and subsequently lowered to 0 psig in a controlled manner, while monitoring the temperature so as not to exceed a predetermined temperature upper limit or drop below a predetermined temperature lower limit. The pressure of goods transferred into space 174 by positive displacement pump 1227, can be adjusted to correspond with the pressure of goods within space 174 by a corresponding adjustment of the fluid transferred through ports 213 and 502. The compressive movement of pistons 246 and 176 can be reversed, also simultaneously, by allowing the extraction of fluid from spaces 248 and 186 through corresponding ports 1240 and 182 respectively, simultaneously, and at flow rates that will allow the controlled outward movement of piston 246 in a direction away from piston member 156, at the same time as piston member 176 is allowed to move in a direction away from piston member 156. Such relative outward movement will reduce the pressure within the cylinder 1216, and result also in a reduction of the temperature. The simultaneous reciprocating movement of piston members 246 and 176, in a first movement toward each other, followed by a second movement away from each other, results in substantially simultaneous elevation and reduction in pressure within space 174. Concurrently with a pressure reduction comes an attendant reduction in temperature. The pressure drop can be controlled so as not to cause substantial freezing of the goods. Alternatively, heating of cylinder 1216 can be provided. Similarly, concurrently with a pressure increase comes an attendant increase in temperature. The pressure increase can be controlled so as not to cause a temperature that may irreversibly damage or cause a defect in the goods. Alternatively, cooling of cylinder 1216 may be provided. The pressure can be as high as from 1000 psig to 1100 psig, followed by a reduced pressure as low as 300 psig to 500 psig. The controlled elevation and reduction of the consequential oscillating pressure within space 174 can be cycled any number of times, wherein during each cycle the same or different pressure and temperature conditions are achieved, including the supercritical pressure and temperature of carbon dioxide. Goods having been exposed to an oscillating pressure within space 174 for a controlled period of retention therein, are finally extracted in the direction shown by arrow 244 through conduit 1232. The period of retention within space 174 can be adjusted and optimized to a period of time sufficient to cause death, or, at the very least, to cause a detrimental affect to any pathogens that may be present with the boneless beef.

Figure 4:
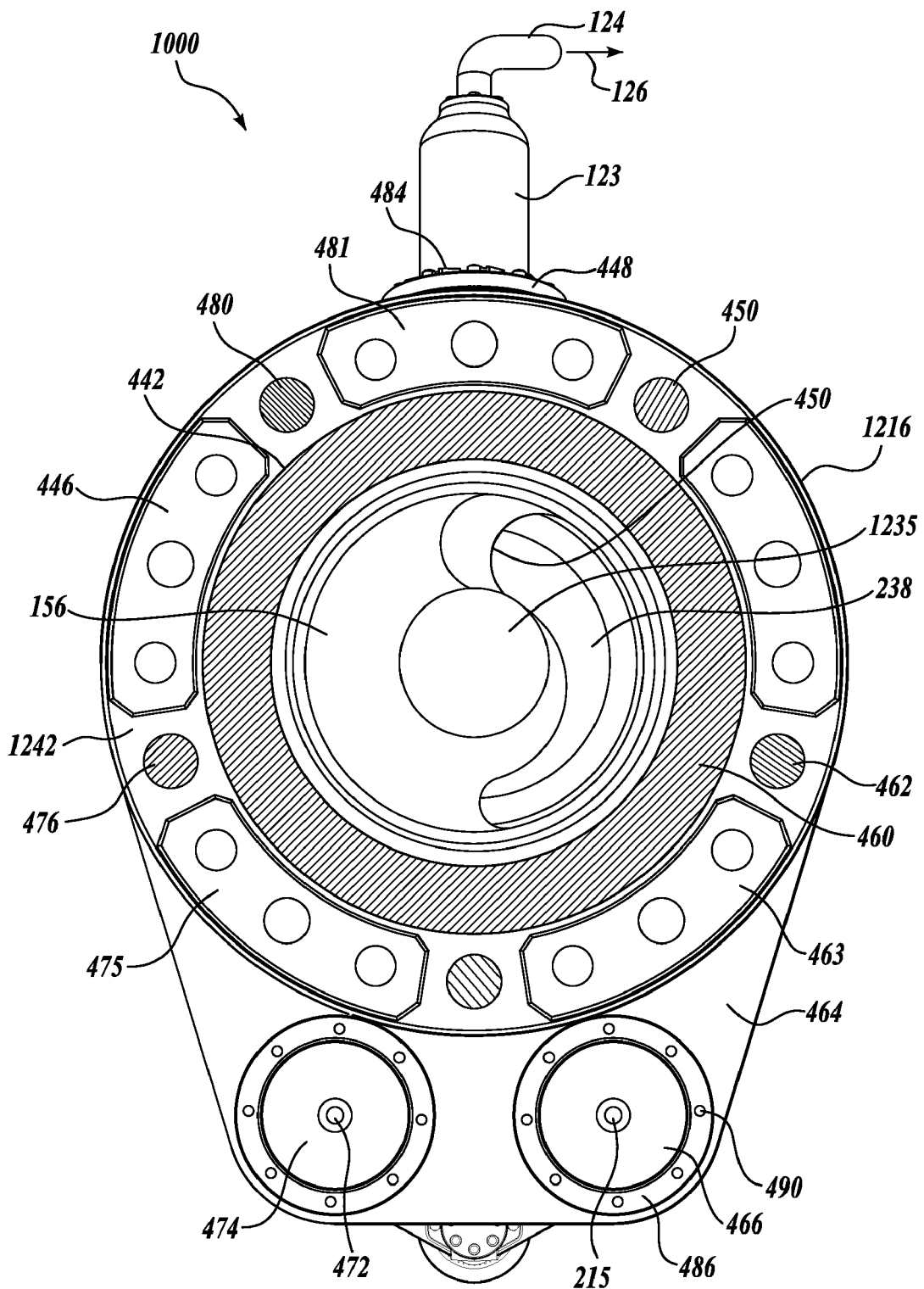
FIG. 4 is a cross section illustration of one embodiment of an apparatus according to the present invention.

Referring now to FIG. 4, a cross section illustration through the apparatus shown in FIG. 1 is provided. The centrally located piston 156 with outer section 460 is in a substantially fluid sealing contact with the inner surface of the cylindrical vessel 1216 along an annular path 442. The centrally disposed conduit 1235 allows the transfer of a fluid agent, such as carbon dioxide, therethrough. An opening 238 is provided in an elliptical arc profile with an edge 251. Pad segments 481, 446, 473, and 463 having a common profile are shown in a circular formation. A mounting platform 464 is shown with cylinder end caps 474 and 466 attached to member 464 by way of a circular pattern of bolts, such as 490, at flanges, such as 486. Ports 472 and 285 are provided in end caps 474 and 466 to allow the transfer of pressurized hydraulic fluids, such as water, therethrough. The annular ring 1242 is mounted and rigidly fixed to shafts 476, 480, 450 and 462. Bell chamber 123 is attached to a cylinder end cap at a flange 448 by bolts, such as 484, in a rigid fashion. Conduit 124 allows the transfer of surplus fluid there through in the direction shown by arrow 126 or, alternatively, as may be required, in an opposing direction to that shown by arrow 126.

Referring again to FIG. 3, boneless beef with proportionately measured quantities of carbon dioxide and water are transferred into space 174 such that the space is filled between pistons 246 and 176. Pistons 246 and 176 are arranged to oscillate according to sequences that will generate conditions lethal to pathogens or at least, will detrimentally affect them. Surplus carbon dioxide can be extracted via bell chamber 123 and space 146 through conduit 124 in the direction shown by arrows 137 and 126. A proximity switch 125 is provided at a convenient location so as to provide a means of measuring the density of any matter contained within the bell chamber 123. In the event that boneless beef or other such product intended to be treated within the apparatus enters bell chamber 123, proximity switch 125 can identify the density and the transfer of carbon dioxide through conduit 125 can be stopped. Beef transferred into space 174 progressively moves toward piston member 156 and through aperture 238 in the direction shown by arrow 226 and thence toward conduit 1232. After processing, the boneless beef is transferred into conduit 1232 in the direction shown by arrow 244 and progressively toward positive displacement pump 1231 with housing 234 and rotating cone 236 which operates in a similar fashion to positive displacement pump 1227 with housing 199. However, the transfer of boneless beef through pump 1231 is in an opposite direction of flow and positive displacement pump 1231 with housing 234 is arranged to provide a lowering of pressure while maintaining the pressure in space 174. Positive displacement pump 1231 with housing 234 is arranged with hydraulic drive motor 228 connecting directly through drive shaft 230 to spur gear 232 which in turn engages with gear ring 262 in turn fixed rigidly about an outer circular face of cone 236. Boneless beef transferred via conduit 1232 is directed into cylinder 1230 with a matching piston therein (not shown) and in such a manner that the pressurized boneless beef from space 174 causes the piston to travel along the internal horizontal path within cylinder 1230 and toward port 215. Pressurized water transferred through port 215 provides a cushioning effect and a resistance against the opposite side of the piston to that side on which boneless beef exerts pressure. When the piston has traveled to the extreme and furthermost limit within cylinder 1230 and toward port 215, cone 236 is rotated, and boneless beef traveling through conduit 1232 is diverted at a controlled rate into a second cylinder (not shown) located adjacent to, parallel with, and in similar fashion to cylinder 1230. Piston retained within cylinder 1230 is then forced in a direction away from port 215 by transfer of a pressurized fluid, such as water, through port 215. The pressure of the fluid transferred through port 215 will be substantially lower than the pressure within space 174. The pressure of fluid supplied to port can be 150 psig. Boneless beef is transferred at this lower pressure along space 229 through conduit 231 in the direction of the arrow 220. Cylinder 1230 is mounted rigidly to mounting rings 1244 and 128. Boneless beef transferred from conduit 231 may then be directed through an inline grinder (not shown).

Figure 6:
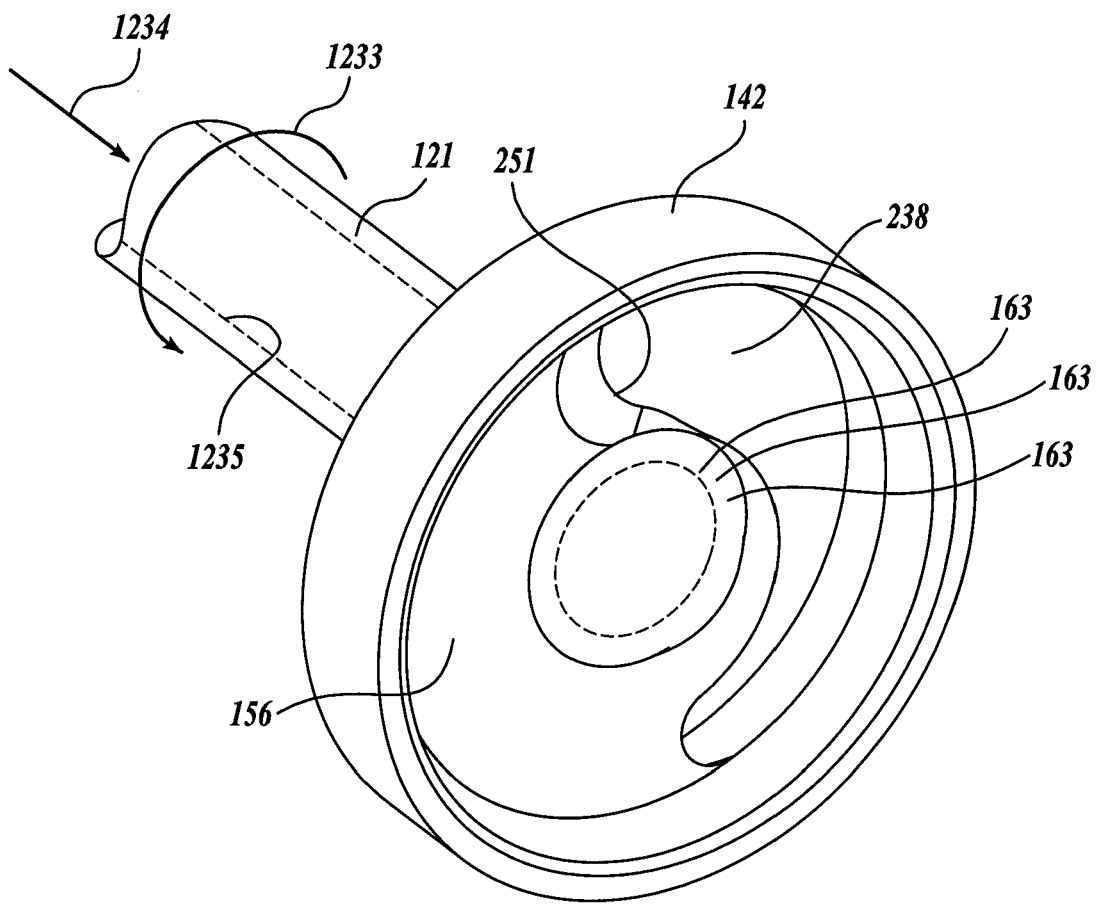
FIG. 6 is an illustration of a component of one embodiment of an apparatus according to the present invention.

Referring now to FIG. 6, an illustration of a mixer is provided. The mixer includes the shaft 121 rigidly fixed at a central location to the piston member 156. The shaft 121 is arranged with bearings under normal operation to rotate in a direction shown by arrow 1233 or, alternatively, in a direction opposite to arrow 1233. The conduit 1235 is provided along the center of shaft 121 and in direct communication with perforations or slots 163, enabling the transfer of any matter, such as fluid agents in the direction shown by arrow 1234. Piston member 156 has a peripheral profile 153 which can be provided with suitable piston seals. Opening 238 is surrounded by an edge 251 through which ultrasonic energy can be transferred.

Shaft 121 and piston member 156 can provide a mixer to mix the contents of space 174. Boneless beef, carbon dioxide and water in space 174 are pressurized by the movement of piston member 156 that is driven by the movement of the shaft 121 in a direction toward piston 176. Piston member 156 can also be rotated about the axis of the shaft 121, simultaneously with the horizontal movement toward piston 176. The pressurizing of the contents in space 174 causes the contents to be transferred through opening 238 in the direction shown by arrow 226 (seen in FIG. 3). Carbon dioxide is also mixed with the contents in space 174.

As shown in FIG. 1, an ultrasonic generator 1236 provides ultrasonic energy, which is transferred through shaft 121 and to the profile of the edge 251 following the perimeter of aperture 238 in piston member 156, which comes in direct contact with the boneless beef passing through aperture 238. Beef is, therefore, exposed directly to the ultrasonic energy and the effects thereof. When ultrasonic energy is applied to boneless beef in this manner, any group or groups of bacteria comprising single cell animals, such as *E. coli* 0157:H7 that can accumulate in groups, can be separated and mixed with the carbon dioxide and the water that is present in the same vicinity. The mixing action of the rotating piston member 156 in combination with ultrasonic energy effectively mixes and separates single cell bacteria. The action of the piston member 156 in combination with an oscillating pressure and temperature provided by the two horizontally opposed piston members 246 and 176, provide an effective means of killing, injuring, or at least detrimentally affecting any bacteria that may be present with the boneless beef.

After the boneless beef, or other goods, have been processed, it may be necessary to empty the contents, followed by sanitation of the apparatus 1000 as required according to governmental regulations, such as those dictated by USDA and FSIS in the USA. Boneless beef is removed from space 174 by applying pressurized water into space 186 such that piston member 176 will be pushed laterally and toward piston member 156. Piston member 176 can be pushed toward piston member 156 at the same time as piston member 156 travels toward piston member 246. A relatively small quantity of pressurized fluid, such as water, can be injected into space 248 in a volume sufficient to cause piston member 246 to move away from contact with end cap 122. Piston members 156 and 176 can be moved toward piston member 246 until all three piston members 246, 156, and 176 are in direct contact with one another, such that piston member 156 is interposed between piston 246 and piston 176. In this way, the contents of space 174 and the space between pistons 176 and 156 are completely removed via conduit 1232. A continued rotation of shaft 121 with piston members 246 and 176 in direct and firm contact with piston member 156 will cause any remaining boneless beef, or other such goods, to be emptied into and through conduit 1232. Pressurized carbon dioxide fluid can be transferred through bell chamber 123 in the direction opposite to that shown by arrow 137 at such a pressure that will cause any remaining boneless beef to be transferred through conduit 124. After emptying space 174 in the manner described, the apparatus 1000 can be depressurized to atmospheric pressure. After depressurizing, end caps 1219 and 122 can be opened and separated from contact with cylinder 1216. This is achieved by providing pressurized fluid into hydraulic cylinders 1210 and 1215, and a series of additional hydraulic cylinders not shown in FIG. 3 but identified as 1214 and 1218 in FIG. 1. Hydraulic fluid is provided to separate a series of steel pads more clearly shown in FIG. 4, but identified as 1211 and 1212 in FIG. 3. Hydraulic cylinders, such as 1210 and 1215, are attached to shafts 154 and 164 (best seen in FIG. 3) in direct and rigid connection to pads 1211 and 1212, such that when pad members 1211 and 1212 are separated in horizontally opposing directions, shafts 154 and 164 slide through bearings mounted in annular retaining rings 1242 and 1244. A series of shafts connected to end caps 1219 and 122 at end cap flanges 1221 and 127, respectively, apply pressure causing the separation of end caps 1219 and 122 in horizontally opposing directions away from cylinder 1216. The application of a horizontally opposing pressure separates the end caps from cylinder 1216, while retaining the end caps 1219 and 122 in a horizontally disposed and separated position thereby allowing a visual inspection of the internal surface of the end caps 1219 and 122, and also cylinder 1216. Furthermore, the separation of the end caps 1219 and 122 away from horizontal cylinder 1216 is also arranged to open positive displacement pump 1231 with outer housing 234 rigidly mounted to end cap 122 and positive displacement pump 1227 with outer housing 199 rigidly mounted to end cap 1219. The revolving cone 236 of outer housing 234 is attached via bearings to annular ring 128, and the revolving cone 200 is similarly attached via bearings to annular ring 1226. Therefore, when end caps 122 and 1219 are separated from horizontally disposed cylinder 1216, the cones 236 and 200 of both positive displacement pumps 1231 and 1227 are separated by extraction from their respective housings 234 and 199. Cylinders 1230 and 1229 rigidly mounted to annular rings 128 and 1242 and annular rings 1244 and 1226, separate from their connection seals attached to housings 234 and 199, thereby allowing direct visual inspection of surfaces that come into contact with goods, such as boneless beef, under normal operation. In the opened position, the apparatus 1000 can be fully inspected visually and pistons 246 and 176 can be removed from their normal operating locations as can pistons located within positive displacement pumps such as in cylinder 1230 and 1229.

According to a method of sanitizing the internal surfaces of the apparatus, fluids, such as water, provided under pressure into spaces 248 and 186, and also via ports 215 and 213 and others, not shown, can be mixed with sanitizing chemicals prior to disassembly of the apparatus, and other fluids such as chlorine, chlorine dioxide, and/or ozone can be transferred through ports 1240, 182, 215, 213, and also via conduit 124 and also through conduit 1235. In this way, substantially all internal apparatus surfaces can be sanitized automatically prior to opening for visual inspection.

In a further embodiment, the normal operation of apparatus 1000 shown in FIGS. 1-6, the selected pressure and temperature of any fluid or product used in the operation of the apparatus or additionally any mixture of agent and product transferred through space 174 can be controlled by maintaining selected pressures after providing the operating fluids and goods being processed at known primary temperature and pressure. Furthermore, the temperature of goods processed in space 174 can be measured according to the resistance and back pressure exerted by the goods being processed. For example, the resistance exerted against both the rotating and reciprocating drive mechanisms attached to shaft 121 and piston 156 will increase when the pressure within space 174 is lowered. This resistance will increase as a consequence of a reduction in temperature caused by a pressure reduction. When water blended with boneless beef and carbon dioxide partially freezes as a consequence of a reduced pressure in space 174, the viscosity of the mixture will increase and can be measured by determining a variation in resistance. Alternatively, pressure and temperature transducers can be provided at any convenient location within the apparatus 1000 to monitor the pressure and temperature conditions during operation of the apparatus 1000.

The apparatus, as described in connection with FIGS. 1-6, can be used to destroy or render harmless viruses such as hepatitis, malaria, tuberculosis, the SARS virus, and also the extraction of prions that may have become mixed with the boneless beef. Such prions may be the cause of BSE (bovine spongiform encephalopathy). It is well known that in order to destroy BSE prions, they must be heated to a very high temperature and to such an extent that the molecule will change form by decomposition or reaction with other elements or compounds. Such temperatures cannot be applied to food, such as boneless beef, and therefore, the preferred means of dealing with such a food safety matter can occur by removal from the food stream. In the event that such prions are known to be present with any food, the food product must be removed from the food chain and dealt with as required according to USDA regulations. However, the apparatus disclosed in connection with FIGS. 1-6 may provide a useful precautionary means of washing boneless beef portions with super critical carbon dioxide and then separating the boneless beef from fluidized extracts collected in a stream of carbon dioxide fluid. In this way, after processing in space 174, the stream of goods and fluids would be separated into two streams wherein one of the streams would comprise carbon dioxide fluid and the extracted matter washed from the outer surfaces of the boneless beef.

Figure 7:
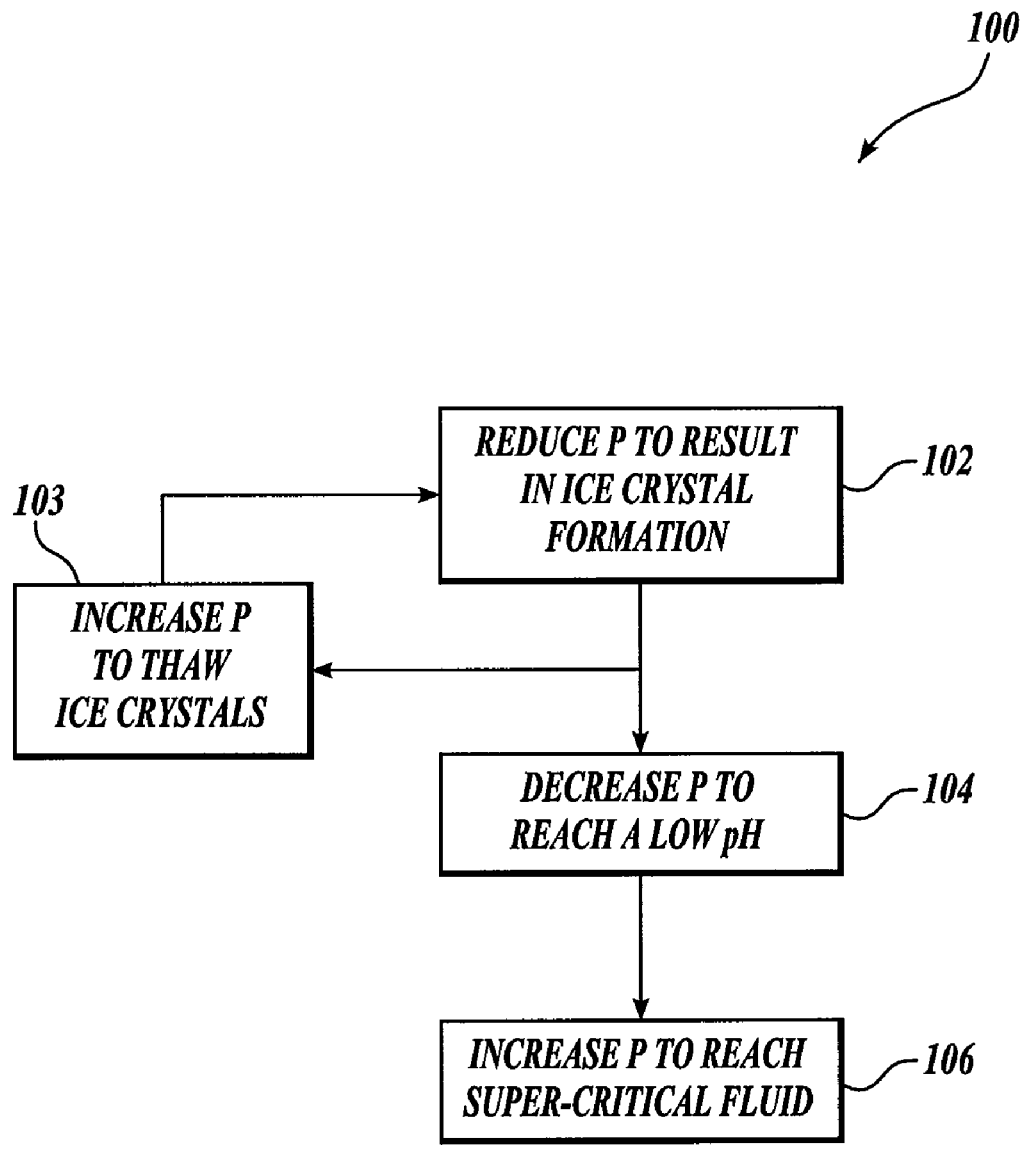
FIG. 7 is a flow diagram of one embodiment of a method according to the present invention.

Referring to FIG. 7, a tripartite method according to one embodiment of the invention is illustrated. A method in accordance with one embodiment of the present invention includes introducing goods, such as meat, carbon dioxide, and optionally water under pressure in the range of 200 psig to 500 psig or, alternatively, thereafter, raising the pressure of carbon dioxide within the apparatus illustrated in FIGS. 1-6 such that when the pressure is reduced, the water that is on the surface of the goods will freeze, block 102. However, the reduction in pressure is controlled so that there is insubstantial freezing of the water below the surface. Such controlled reduction in pressure is the result of withdrawing pistons 246 and 176 outwardly by the release of fluid in chambers 248, and 186, respectively. In accordance with this embodiment of the invention, when the water freezes on the surface of the boneless beef, wherein microorganisms may reside, needle like ice formations of microscopic size, form in a random pattern. As the freezing process of water continues, the needle like ice formations become part of the solid ice that can form when all water present is frozen solid. The needle like ice crystal formations perforate the microorganisms' cell walls and membranes. When the ice crystals thaw and defreeze, the perforations are left behind allowing low pH dense carbon dioxide or supercritical carbon dioxide to enter the microorganisms through the perforations. A pH differential of at least about 1 or less can detrimentally affect or damage the microorganisms, so too can the supercritical carbon dioxide solvent when it enters the microorganisms. Furthermore, pH fluctuations of at least about 1 between the inside of cells and the outside of cells can cause further damage. To cause the needle like ice crystal formations, liquid or dense carbon dioxide is in contact with the surfaces of the beef in sufficient quantities to cause freezing of the free water that is in contact with the microorganisms. To this end, free water may be added to ensure that all the surfaces of the beef that potentially could have been contaminated have a thin layer of water that surrounds and is in contact with the microorganisms. Such water later freezing and causing damage to the microorganisms. It is intended that a feature of the apparatus now being described, is the capability to cause the partial freezing of water by rapidly elevating and reducing the pressure of the water and carbon dioxide with the boneless beef within space 174. More particularly, the reciprocating action of pistons 246 and 176 can be arranged to cause partial freezing of water provided therein, which is in direct contact with the surface of the boneless beef. Such reciprocating piston movement can also cause the flexing of the contents of space 174 and when bacteria cells are exposed to this physical action, the needle like ice crystals can affect the bacteria cells in a detrimental manner, such as by puncturing the cell walls. The rapid formation of needle like ice crystals corresponding with a pressure reduction, followed by the rapid elimination thereof corresponding with an increase in pressure and temperature, can provide an environment lethal to single cell pathogens. The lethality of the environment is created due to several mechanisms that relate directly to the temperature and pressure of the carbon dioxide. For example, when the pressure of carbon dioxide is lowered to, for example, 300 psig, from an existing pressure of 1000 psig at 50 degrees F., the temperature of the lower pressure carbon dioxide will fall below the freezing point of water, therefore, causing ice crystals to form. When a mixture of the appropriate proportions of liquid phase carbon dioxide with liquid phase water and boneless beef, all held at a pressure of 1000 psig and temperature of 40 to 50 degrees F., and the pressure is reduced to, for example, from 300 to 400 psig, the temperature of the carbon dioxide will drop to below 20 degrees F., and when sufficient carbon dioxide is present with the liquid phase water, ice crystals will form. Ice crystals formed in this manner can have needle like characteristics easily capable of rupturing the cell wall of a pathogen, such as $E.$ $coli$ 0157:H7. Before substantial freezing of the food below the surface can occur, the pressure is rapidly elevating to raise the temperature, block 103. The cycle can be repeated as many times as is desired. With the apparatus 1000 of FIGS. 1-6, the pressure of carbon dioxide can be oscillated, wherein the upper and lower pressure limits are selected below the super critical phase of carbon dioxide. The lower pressure limits can be selected so as to ensure formation of ice crystals when the pressure is oscillated to a low pressure, and the upper pressure limits can be selected so that the ice crystals are substantially eliminated when the pressure is oscillated to a higher pressure. Such oscillation between low and high pressures can cause a corresponding oscillation of freezing and thawing temperatures. Any water mixed in or on the surface of the goods will freeze when the temperature at the lower selected pressure is sufficiently below the freezing point of water, and the water will thaw when the temperature at the higher pressure is sufficiently above the temperature at which water will freeze. When carbon dioxide and water are mixed together and are present at the surface of goods, such as meat (or fruits and vegetables), the ice crystals formed can, due to the needle-like morphology that ice crystals so formed can create, be lethal to bacteria by rupturing the cell walls thereof.

In another method in accordance with another embodiment of the present invention, the pressure and temperature conditions can be adjusted such that carbon dioxide, water, and boneless beef are retained under elevated pressure of, for example, up to, but less than approximately 1000 psig, such that the carbon dioxide and water react together to form carbonic acid having a pH in the range of about 2 to about 5, preferably about 3 to about 4. Alternatively, the pH can be less than 3, 4, or 5. The pH range can be about 2 to about 5, or any value in between. The hydrated carbon dioxide ($CO_2$. $H_2O$), or more correctly $H_2CO_3$, is a defined compound having dissociated ions represented by [$H^+$] [$HCO_3^-$] at 1000 psig. This condition results in a lowering of the pH that affects pathogens in a detrimental manner, and if sufficiently low can be lethal to pathogens and, in particular, when the pathogens have been previously detrimentally affected or injured, such as by the puncturing of the pathogen cell wall membrane, as discussed above. The needle like ice crystals are capable of injuring pathogen cells by puncturing the cell walls, and when this condition is followed immediately by an elevated pressure of approximately 1000 psig, the resultant lower pH can more readily access the internal regions of the pathogen cell, thereby lowering the cell pH sufficient to cause death of the pathogen. The raising of the pressure to levels of about 1000 psig to cause a low pH can be affected by the apparatus 1000, shown in FIGS. 1-6.

In yet another method in accordance with another embodiment of the present invention, a different set of temperature and pressure conditions can be achieved within the apparatus 1000 that affects the microorganisms in a detrimental manner, block 106. When carbon dioxide is pressurized above about 1100 psig and heated above about 88° F. (or 36° C.), i.e., the critical pressure and temperature of carbon dioxide, carbon dioxide is a supercritical fluid. Supercritical carbon dioxide is detrimental to bacteria, such as $E.$ $coli$ 0157:H7, when the bacteria are exposed to a sufficient quantity of the supercritical carbon dioxide. In this embodiment, a blend of carbon dioxide, water, and boneless beef are provided to the apparatus 1000. The pressure is elevated above 1056 psig at a temperature greater than 88 degrees F., i.e., greater than the supercritical pressure and temperature of carbon dioxide. At the supercritical conditions, the carbon dioxide possesses aggressive solvent properties capable of dissolving lipids. The cell walls of pathogens are constructed of a complex structure of lipids, and these cell wall lipids will dissolve when exposed to a powerful solvent, such as super critical phase carbon dioxide. Supercritical pressure and temperature can be produced before or after any one of the other sets of conditions, discussed above, that detrimentally affect the microorganisms. Furthermore, all three sets of conditions can be sequenced in any order, as illustrated, and repeated any number of times, in the same, or a different sequence, or even one set of conditions may be repeated two or more times before changing to another set of conditions. In summary, the apparatus 1000 can be used to provide three procedures of varying pressure and temperature conditions of carbon dioxide that affect microorganisms in a detrimental manner and can be carried out in any order and repeated as many times as desired. Such procedures include: (1) oscillating between low and high pressure to cause ice crystal formation and thawing in rapid succession, (2) raising pressure to create a dense phase of carbon dioxide with a low pH, and (3) raising pressure to change to supercritical carbon dioxide to affect the cell wall lipids of microorganisms.

The apparatus as herein described in association with FIGS. 1-6 is capable of transferring boneless beef portions through a pressure vessel and oscillating the pressure between any lower pressure, such as about 300 psig, 350 psig, 400 psig, 450 psig, 500 psig, and so on, and up to an elevated pressure of about 1100 psig or greater, thereby causing multiple sets of circumstances detrimentally affecting microorganisms, such as pathogens. Such lowering of pressure leads to temperature changes, such that at a lower pressure, ice crystals with needle like characteristics will form, and conversely, upon raising the pressure of carbon dioxide, a low pH acid is created at an elevated pressure of, for example, about 1000 psig and finally, by increasing the pressure and temperature to supercritical levels above 1058 psig and above 87.8 degrees F., lipid dissolving solvent characteristics are achieved. The raising and lowering of pressure to achieve ice crystal formation, low pH, or lipid dissolving solvent characteristics via carbon dioxide can be practiced in any order and repeated as many time as is desired.

In one embodiment of the present invention, carbon monoxide may be provided in a proportioned mixture with sub or supercritical carbon dioxide, wherein the amount of carbon monoxide does not substantially exceed 0.4% of the mixture, and wherein the quantity of carbon dioxide is approximately 99.6%.

Apparatus as described and shown in FIGS. 1-6 may be used alone, or in combination with other similar apparatus to perform the following methods.

In another embodiment of a method in accordance with the present invention, boneless beef and carbon dioxide is blended in a first vessel. The temperature of the beef surfaces and carbon dioxide will be elevated to greater than about 88° F. (36° C.) and the pressure within the vessel will be approximately 600 to 800 psig. A measured amount of water may also be included to compensate for previous or anticipated moisture loss in beef and to provide a beef product with a desirable moisture content. The boneless beef, carbon dioxide, and optionally water, will be mixed together so as to ensure that carbon dioxide contacts and dissolves into the liquid at the surface of the beef, and to further penetrate the beef to a depth greater than about ⅛ of an inch. In this way, carbon dioxide will become dissolved at the surfaces. The pressurized boneless beef, carbon dioxide, and optionally water, are then transferred under pressure into a second vessel, which is maintained at a temperature greater than about 88° F. (36° C.) and at least a pressure equal to the pressure of the boneless beef and carbon dioxide specified in the first vessel. After transfer into the second vessel, the pressure can be lowered to such a degree that gaseous carbon dioxide will boil off from substantially all surfaces of the beef so as to provide a layer of gaseous carbon dioxide in contact with substantially all meat surfaces in the vessel. Thereafter, the internal pressure of the second vessel can be elevated to a pressure above approximately 1100 psig, for example, about 1100 psig to about 5000 psig, preferably, about 3000 to about 5000 psig, while still ensuring that the temperature at the surfaces of boneless beef is at least 88° F. (36° C.), such as between about 90° F. to about 100° F. Preferably, the temperature should not exceed about 104° F. to about 105° F. By ejecting the boneless beef from the second vessel, which may be via a grinder, the temperature of the boneless beef will be reduced accordingly. By allowing the controlled expansion of carbon dioxide, a chilling effect is achieved. The amount of carbon dioxide evaporated will be adjusted such that the temperature of the boneless beef will be reduced to a selected temperature, such as about 32° F. or within a range of, for example, about 28° F. to about 36° F.

Another method of cold pasteurization of fresh beef, by use of carbon dioxide as the primary agent, is disclosed in the following steps. Beef and carbon dioxide are mixed in a vessel. The temperature of the beef surfaces is held at about 30° F. to about 36° F. The carbon dioxide is at about 600 psig to about 800 psig and at about the same temperature as the beef. The boneless beef, carbon dioxide (and optionally water), can be mixed together so as to ensure that carbon dioxide contacts and dissolves into the liquid phase at the surface of the beef, and to further penetrate the beef to a depth up to or deeper than about ⅛ of an inch. In this way, carbon dioxide will dissolve at substantially all surfaces of the beef. Thereafter, the boneless beef, carbon dioxide, and optionally water are then transferred under pressure into a second vessel that is maintained at a substantially constant temperature at about 30° F. to 36° F., and at least at a pressure equal to the pressure of the boneless beef and carbon dioxide as specified above. After transfer into the second vessel, the pressure can be lowered to a degree such that gaseous carbon dioxide will boil off from substantially all surfaces of the beef so as to provide a layer of gaseous carbon dioxide in contact with substantially all meat surfaces in the vessel. After the process of boiling of carbon dioxide has been substantially completed, the internal pressure of the second vessel can be elevated to a pressure above about 1100 psig, for example, about 1100 psig to about 5000 psig, or preferably, about 3000 psig to about 5000 psig, while still ensuring that the temperature at the surfaces of the boneless beef is at least 88° F. (36° C.), for example, between about 90° F. to about 100° F. Preferably, the temperature should not exceed 104° F. to 105° F. Thereafter, the boneless beef can be ejected from the second vessel, which may be via a grinder, such that the temperature of the boneless beef will be reduced accordingly. By allowing the controlled expansion of carbon dioxide, a chilling effect is achieved. The amount of evaporated carbon dioxide will be adjusted such that the temperature of the boneless beef will be reduced to a temperature of about 32° F. or within a range of about 28° F. to about 36° F.

Another embodiment of a method according to the present invention of cold pasteurization of fresh meat, by use of carbon dioxide as the principle agent with a blend of ethanol and water, is disclosed in the following steps. Boneless beef is blended under pressure, with carbon dioxide and a measured quantity of an aqueous solution comprising about 5% ethanol, wherein the balance is water. The temperature of the meat will be at about 30° F. to about 36° F. and the carbon dioxide will be about 600 psig to 800 psig and at about the same temperature as the meat. A measured amount of water may also be included to compensate for prior or anticipated moisture loss in the beef to produce a beef product having a desired amount of moisture. The boneless beef, carbon dioxide, ethanol solution, and optionally water, will be mixed together so as to ensure that carbon dioxide and ethanol solution contacts and dissolves into the liquid phase at the surface of the meat, so that the carbon dioxide penetrates the meat to a depth about equal to or greater than about ⅛ of an inch. In this way, carbon dioxide will become entrained at substantially all surfaces of the beef. The pressurized boneless beef, carbon dioxide, and measured quantity of ethanol solution, are then transferred under pressure into a second vessel, which is maintained at a substantially constant temperature of about 30° F. to about 36° F. and a pressure at least equal to the pressure of the boneless beef and carbon dioxide as specified above. After transfer into the second vessel, the pressure can be lowered to such a degree that gaseous carbon dioxide will boil from substantially all surfaces of the beef so as to provide a layer of gaseous carbon dioxide in contact with substantially all meat surfaces in the vessel. After the process of boiling of carbon dioxide has been substantially completed, the internal pressure of the second vessel can be elevated to a pressure above about 1100 psig, for example, about 1100 psig to about 5000 psig, preferably, about 3000 psig to about 5000 psig, while still ensuring that the temperature at the surfaces of the boneless beef is approximately 30° F. to 36° F. The boneless beef is then extracted from the second vessel and immediately exposed to ambient atmospheric pressure. The beef extraction may be via a grinder and the temperature of the boneless beef will be reduced by rapid expansion and/or boiling of the carbon dioxide. By allowing the controlled expansion of carbon dioxide, a chilling effect is achieved. The amount of carbon dioxide evaporated will be adjusted such that the temperature of the boneless beef will be reduced to a selected temperature, such as about 28° F. to about 36° F.

Another embodiment of the present invention includes the following steps. Beef and carbon dioxide are pressurized within a first "unsealed" pressure vessel which may include an extruder, such as a twin or a single screw in a first temperature controlled condition for a selected period of time of about 1 to about 15 minutes. During this step, an agent such as carbon dioxide, may be injected into the first pressure vessel with any other selected agents at a pressure of about 500 psig to about 5000 psig and at any selected temperature. During this step, a proportion of the bacterial population of the meat may be killed. The pressure in this first step may be about 500 psig to about 5000 psig, and may achieve a reduction in the bacteria population of log 0.3 to log 2. Thereafter, the beef and carbon dioxide are transferred to a second "unsealed" pressure vessel and conditions are adjusted to a second temperature or range of temperatures of about 30° F. to about 104° F. and a pressure of about 500 psig to about 5000 psig. Antimicrobial agents, such as liquid or supercritical carbon dioxide at a temperature of about 40° C. and at about 3000 psig can be added to the second vessel. The period of exposure in the second vessel is 1 minute to about 2 hours to a achieve a bacteria reduction of about log 0.5 to log 3. Thereafter, the mixture is transferred in a mass flow controlled stream through a first, variable speed grinder and into an enclosed conduit filled with a gas, such as carbon dioxide. The conduit is connected directly to a third vessel at a lower pressure than the second vessel and the temperature is controlled at about 32° F. The pressure on the second vessel side of the grinding plate is therefore considerably higher than the third vessel side of the grinding plate. It may be preferable to elevate the pressure of the third vessel so that a pressure drop across the grinding plate is about 500 psig, so, for example, the second vessel pressure is about 3000 psig and the pressure within the third vessel is approximately 2500 psig. The pressure drop between the second and third vessels will result in a substantial drop in temperature and pressure which can cause additional death and injury to the bacteria. A series of staged pressure drops between a corresponding fourth, fifth and sixth or more, pressure vessels or conduits can be arranged. Most preferably, the final vessel is at atmospheric pressure, and can be a blending apparatus with a suitable pump attached to enable measured and controlled pumping of a blended stream of ground and chilled beef into a conduit attached to a fat measuring device. The stream can then be combined with at least one other stream of ground beef having been treated, measured, and controlled in similar fashion in equipment located adjacent to the first set of equipment, and may achieve a bacteria reduction of log 0.2 to log 2. The combined first and second treated streams of ground beef can then be transferred, in a single stream, via enclosed and selected gas filled blending, pumping and proportioning equipment to a suitable packaging machine, such as a K-Pak chub machine, ensuring that any voids in the finished chub package are substantially filled with carbon dioxide gas or alternatively to a pattie former, such as a Formax. During the period that the ground beef resides in a chub package which can be as much as 28 days given that temperature is maintained at approximately 4° C., death of injured bacteria can be substantial, and may achieve a bacteria reduction of log 1 to log 5.

In another embodiment of the invention, meat, such as boneless beef, can be packaged in any gas barrier packaging and stored in refrigeration for sufficient time to ensure adequate bacteria death after treatment with carbon dioxide at pressure of about 300 psig to about 1000 psig. Barrier packaging includes any packaging materials that are substantially gas impermeable. By allowing the beef treated with carbon dioxide, pasteurization of the boneless beef (i.e., a 5 log kill of bacteria population on the beef) can be achieved (or with a greater or lower bacteria population as may be required), by firstly treating the beef in a process as described in association with the apparatus of FIGS. 1-6, followed by packaging in gas barrier material for a suitable period such as 4 hours and up to 20 days.

EXAMPLES

The antimicrobial effects of carbon dioxide at pressures of about 300 to about 1000 psig with time and temperature on fresh beef inoculated with *E. coli* 0157 were investigated to determine the effects of post treatment storage of meat in an approximately 100% carbon dioxide atmosphere at ambient pressure and about 4° C. on any surviving *E. coli* 0157 bacteria, and to study the antimicrobial effects of super critical carbon dioxide on the natural micro flora of meat.

Experiments were carried out at Kansas Sate University (KSU) Food Science Institute, Food Microbiology lab. Full details and drawings of the equipment are documented at the University.

High Pressure Reactor

To carry out the experiments, a high pressure reactor was designed to the following specifications.

A vessel built to withstand about 3000 psig with top and bottom vents for the addition/venting of carbon dioxide gas as required.

An analog pressure gauge.

A digital temperature recorder on the top vent from the vessel.

A pH probe that could be raised/lowered into the center of the reactor top.

A supply of liquid carbon dioxide at about 300 psi and −20° C.

A supply of gaseous carbon dioxide heated to about 56° C. in a hot water bath.

A supplementary probe to measure the temperature of the reactor barrel surface.

Lap top computer to record temperature data.

Figure 8:
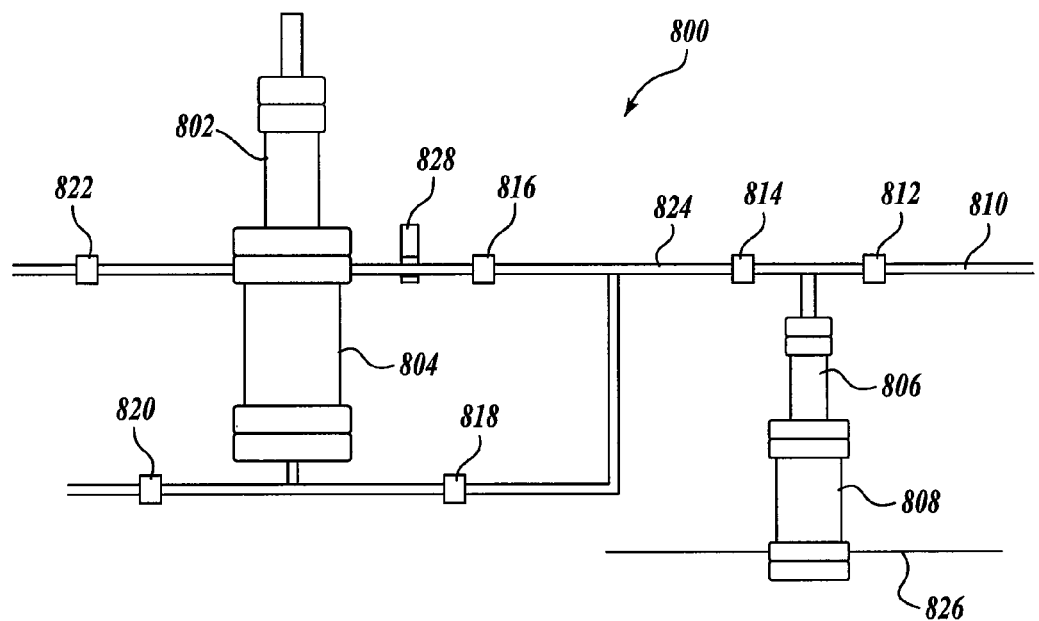
FIG. 8 is a schematic illustration of equipment used for experiments according to the present invention.

FIG. 8 is a schematic illustration of laboratory equipment 800 used in carrying out various tests of the treatment of meat with carbon dioxide. The apparatus 800 includes pressure cylinders 804, 806, and 808 with high-pressure piping 824, pressure release safety valve 828 and on/off valves 812, 814, 816, 818, 820, and 822. Meat samples, having been inoculated, are suspended from a centrally located shaft within the cylinder 804 and the upper member 802 is bolted to the cylinder 804 in a manner that substantially ensures a leakproof and pressure tight seal. A stream of fluid carbon dioxide 824 that progressively turns to liquid is transferred into the cylinder 804 until the suspended meat samples therein are immersed in the liquid carbon dioxide. After a recorded and selected period of time, the liquid carbon dioxide is removed from the cylinder 804 and the pressure therein reduced to ambient atmospheric pressure. The samples can then be removed from the cylinder and the reduction of bacteria population determined. The items 806 and 808 are commonly referred to as an intensifier. Opening valve 812 allows filling the cylinder 806 with low pressure fluid carbon dioxide, and then, after isolation of the lower pressure source of the fluid carbon dioxide, a piston in cylinder 808 is activated by hydraulic oil from line 826 (or high-pressure air or gas) and a smaller diameter piston in cylinder 806 compresses the fluid carbon dioxide and elevates the pressure. The higher pressure carbon dioxide fluid in line 824 is then transferred to cylinder 804 via a selected path through high-pressure piping 824 as shown.

Figure 9:
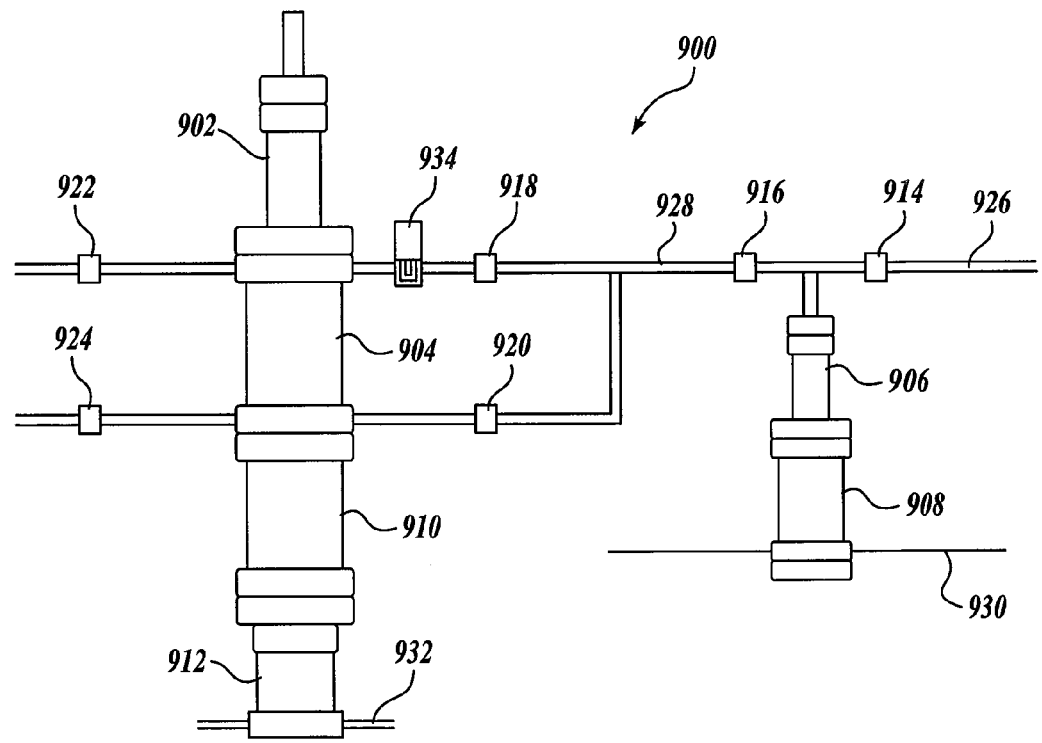
FIG. 9 is a schematic illustration of equipment used for experiments according to the present invention.

FIG. 9 is a schematic illustration of laboratory equipment 900 comprising pressure cylinders 904, 910, 906, 908, and 912 with high-pressure piping 928, pressure release safety valve 934 and on/off valves 914, 916, 918, 920, 922, and 924. The intensifier 906 and 908 in FIG. 9, operate as described similar to items 806 and 808 in association with FIG. 8. The low pressure carbon dioxide line 926 feeds cylinder 906, and then, after isolation of the lower pressure source of the fluid carbon dioxide, a piston in cylinder 908 is activated by hydraulic oil from line 930 and a smaller diameter piston in cylinder 906 compresses the fluid carbon dioxide and elevates the pressure. The higher pressure carbon dioxide fluid in line 928 is then transferred to cylinders 904 and 910. Cylinders 910 and 912 are arranged in a manner that allows rapid pressure increase within cylinder 904 and then rapid pressure reduction through an arrangement of hydraulic piston fed by hydraulic line 932. This can enable the ingress of supercritical carbon dioxide through the membrane (outer skin) of a bacteria cell and when the pressure drops rapidly, the sudden expansion of the carbon dioxide gas inside the cell can cause rupturing of the membrane and death of the bacteria.

Microbiological Inoculation and Analysis of Samples

The Food Microbiology lab was well equipped with equipment, facilities and staff to safely and effectively grow inocula of *E. coli* 0157 and carry out the analysis of samples after treatment. The methodology included the following.

*E. coli* 0157 INOCULUM PREPARATION

Cell cultures were grown overnight in a nutrient broth. The cells were separated by centrifugation and washed in a sterile buffer. The *E. coli* cell suspension was then diluted to give log 7-9 cell per ml.

Meat Sample Preparation

Meat was purchased at a local retail store. The meat was aseptically cut into 1 inch cubes and suspended by attachment to sterile fish hooks. Meat samples were then placed into an inoculation chamber where they were sprayed with about 10 mls of the cell inoculum. This was done ensuring that all 6 sides of each piece of meat received the same exposure to the *E. coli*. The samples were then allowed to stand for about 30 minutes at room temperature to achieve the attachment of the *E. coli* to the meat. One of these meat samples was immediately taken and analyzed for *E. coli* (as a control). The remaining inoculated samples were then placed into the reactor and the experiment started.

Meat Sample Attachment Equipment

One (1) inch meat cube samples were suspended from the pH probe using small fishing hooks and line so that the cubes were suspended in the bottom third of the reactor and were neither touching each other nor the walls of the vessel.

Microbial Analysis

Each meat sample was placed into a sterile bag and weighed, a known volume of sterile buffer was added as a diluent and the meat sample homogenized in a 'Stomacher'. This suspension was then further diluted as 1:10 dilutions and duplicate 1 ml samples were plated onto the surface of agar media formulated for the enumeration of *E. coli* 0157. The bacterial levels were recorded as colony forming units CFU per g. or as log 10 of that number.

Experiments

Several runs of the equipment were made using un-inoculated meat to gain an understanding of the reactor performance.

Meat was placed into the reactor and the pressure was raised to about 300 psig.

The pressure was maintained at 300 psig with the continuous addition of carbon dioxide until the temperature as measured on the temperature probe dropped to 0° C. The carbon dioxide was turned off and held for about 5 minutes. Carbon dioxide liquid and gas was exhausted from the bottom of the reactor so as to minimize the production of carbon dioxide "snow" and the meat samples were removed and their appearance noted.

In the next experiment, the pressure was raised to a final pressure of about 1000 psig. This was done as stated above but on reaching about 300 psig and 0° C., the liquid carbon dioxide was turned off and compressed carbon dioxide at about 56° C. was added until the pressure reached about 1000 psig. On obtaining the final conditions of about 1000 psig and about 0° C., the reactor was held for about 5 minutes and then the carbon dioxide exhausted as before. The meat was removed and its appearance noted.

Conclusion

In both experiments, the meat appeared unaffected by the process. There was a very slight discoloration of the meat due to the carbon dioxide, but the meat quickly "bloomed" so that its appearance was identical to the meat samples that had not been tested. The fat appeared whiter but was mainly unaffected by the process. These observations were surprising since it is believed that in any process that would be antimicrobial there would be some damage to the exposed surface of the meat.

Experiment 1

The methodology was as stated above. The reactor contained inoculated meat. The pressure was raised to about 300 psig until the reactor temperature was about 0° C. The pressure was then raised to about 1000 psig and then held for about 10 minutes.

The data is provided in TABLE 1 below. TABLE 1 shows a first column 1 (SAMPLE #) and below this heading, each horizontal line has a number 1 through 5. The details of inocula used in the testing are shown in line 1. The control is shown in line 2. Lines 3 through 5 (A, B, and C) show the replicates and sample treatment which in line 3A indicates a treatment of 300-1000 psig for 10 minutes. Lines 4B and 5C also show similar treatments. The weight of samples is recorded in column 3, volume of diluents in column 4, column 5 indicates the quantity of plates per replicate and column 6 shows the Colony Formation Units (CFU) in all plates. Column 7 shows the dilution. Column 8 shows the Type of plate and column 9 shows volume. Column 10 shows the final Colony Formation Units (CFU) per gram and column 11 shows the logs of bacteria counted in the samples, inocula and control. It can be seen from the numbers in column 11 that the treatment shown in column 2 has had minor or no effect on the populations of bacteria in the finished replicates.

Experiment 1: Inoculated meat. Liquid $CO_2$ @ 340 psi until ° C. and pressurized to 1000 psi held for 10 min.

TABLE 1

| 1 SAMPLE # | 2 SAMPLE DESCRIPTION | 3 Weight of Sample | 4 Vol. of Diluent | 5 Plates # | 6 CFU in all plates | 7 Dilution | 8 Type of plate | 9 Vol | 10 CFU/g | 11 Logs |
|---|---|---|---|---|---|---|---|---|---|---|
| 1 INOC | Inoculum | 1 | 1 | −2 | 99 | 4 | 4b | 0.0075 | 66,000,000.0 | 7.82 |
| 2 CTRL | Inoculated NT | 14.8 | 50 | 2 | 146 | 4 | t | 0.05 | 49,324,324.3 | 7.69 |
| 3 A | Rep 1.300-1000 psi 10 min. | 9.2 | 50 | 2 | 76 | 2 | 4c | 0.00457 | 4,519,075.3 | 6.66 |
| 4 B | Rep 1.300-1000 psi 10 min. | 11.3 | 50 | 2 | 95 | 4 | t | 0.05 | 42,035,398.2 | 7.62 |
| 5 C | Rep 1.300-1000 psi 10 min. | 10.9 | 50 | 2 | 55 | 4 | t | 0.05 | 25,229,357.8 | 7.40 |

The difference in the counts between the control log 7.69 and the average of the 3 test samples log 7.22 is a very poor 0.47 log reduction. The meat surface appearance was as stated above.

Experiment 2

In this experiment, the temperature of the vessel was lowered to about −17° C. at about 300 psig before raising the pressure to about 1000 psig and holding for about 5 minutes.

The data is provided in TABLE 2 below. TABLE 2 shows a different treatment, as indicated in the description above. However, the results in column 11 show an approximate 1 log reduction of bacteria population after the treatment when compared with the bacteria population prior to the treatment.

Experiment 2: Inoculated meat. Liquid $CO_2$ @ 340 psi until −17° C. held for 5 min. and pressurized to 1000 psi held for 5 min.

TABLE 2

| SAMPLE # | SAMPLE DESCRIPTION | Weight of Sample | Vol. of Diluent | Plates # | CFU in all plates | Dilution | Type of plate | Vol | CFU/g | Logs |
|---|---|---|---|---|---|---|---|---|---|---|
| 6 INOC | Inoculum | 1 | 1 | 2 | 94 | 6 | 4b | 0.0075 | 6,266,666,666.7 | 9.80 |
| 7 CTRL | Inoculated NT | 15.2 | 50 | 2 | 179 | 4 | t | 0.05 | 58,881,578.9 | 7.77 |
| 8 A | Rep 1.300-1000 psi 10 min. | 22.7 | 50 | 2 | 16 | 4 | t | 0.05 | 3,524,229.1 | 6.55 |
| 9 B | Rep 1.300-1000 psi 10 min. | 25.7 | 50 | 2 | 8 | 4 | t | 0.05 | 1,556,420.2 | 6.19 |
| 10 C | Rep 1.300-1000 psi 10 min. | 20.6 | 50 | 2 | 25 | 4 | t | 0.05 | 6,067,961.2 | 6.78 |

The difference between the control log 7.77 and the average of the test samples log 6.5 was log 1.27. Although this was much better kill of E. coli 0157 than in the previous experiment, the meat on removal from the reactor was frozen and brittle. Some of the microbial reduction will have been due to the freezing of the meat. On thawing, the meat bloomed and was again identical in appearance to the untreated meat.

Experiment 3

In this experiment, the time of exposure was extended in comparison to the previous experiment, and some of the treated samples were stored in an approximately 100% carbon dioxide atmosphere at about 4° C. for several days before analysis. This experiment was as performed for Experiment 1, and 6 samples were placed into the reactor and held for about 4 hours at about 1000 psig. Three samples were analyzed immediately and 3 were stored at about 4° C. in carbon dioxide. In this experiment, a thermocouple was fixed to the outside of the reactor surface in order to track the reactor temperature with time. The temperature started at about 0° C. and slowly increased to about 13° C. over the 4-hour period.

The data is provided in TABLE 3 below. Replicates 13A through 18F were all similarly treated as indicated in column 2 (SAMPLE DESCRIPTION). Replicates in lines 13A through 15C show an approximate 1 log bacteria population reduction, however, replicates in lines 16D through 18F show that the population has been reduced by approximately 3 to 4 logs after 4 days' storage in a gas barrier bag filled with carbon dioxide gas at 4° C. and ambient atmospheric pressure.

Experiment 3: Inoculated meat. Liquid $CO_2$ @ 340 psi until 0° C. and pressurized to 1000 psi @ 13° C. held for 4 hours.

post treatment storage in about 100% carbon dioxide, the destruction appears to be greater. The treatment storage can range from greater than 4 hours, 2 days, 4 days, and may be continued up to 20 days or even greater. A benefit of the process is that the surface appearance of the meat was unaffected by the process.

Treatment with Super-Critical Carbon Dioxide

Experiment 4

The above experiments used the most exacting conditions available given the reactor equipment. The survival of natural microflora of meat when treated with carbon dioxide in the super critical range was also investigated.

In the Dairy Science chemistry research lab in Call Hall (KSU), equipment is available to achieve temperatures and pressures above the critical point of carbon dioxide (a Pepmaster GA made by the Suprex Corp.). This device is mainly used for lipid extraction from natural materials prior to further analysis.

The tests were undertaken to determine the efficacy of supercritical carbon dioxide using laboratory equipment shown schematically in FIGS. 8 and 9.

The sample cells 2 in parallel hold about 4 gr of sample which is sufficient to do microbial analysis and the equipment could control pressure up to about 7500 psig, temperature (above ambient), and time. Introduction of E. coli 0157 meat into the lab was not possible. Un-inoculated meat was placed at about 3000 psig and about 36° C. for about 5 minutes and tested for the reduction of bacterial counts.

TABLE 3

| SAMPLE # | SAMPLE DESCRIPTION | Weight of Sample | Vol. of Diluent | Plates # | CFU in all plates | Dilution | Type of plate | Vol | CFU/g | Logs |
|---|---|---|---|---|---|---|---|---|---|---|
| 11 INOC | Inoculum | 1 | 1 | 2 | 96 | 6 | 4b | 0.0075 | 6,400,000,000.0 | 9.81 |
| 12 CTRL | Inoculated NT | 10.7 | 50 | 2 | 159 | 4 | t | 0.05 | 74,299,065.4 | 7.87 |
| 13 A | Rep 1.300-1000 psi 4 hr. | 12.4 | 50 | 2 | 21 | 4 | t | 0.05 | 8,467,741.9 | 6.93 |
| 14 B | Rep 1.300-1000 psi 4 hr. | 14.3 | 50 | 2 | 25 | 4 | t | 0.05 | 8,741,258.7 | 6.94 |
| 15 C | Rep 1.300-1000 psi 4 hr. | 12.2 | 50 | 2 | 35 | 4 | t | 0.05 | 14,344,362.3 | 7.16 |
| 16 D | Rep 1.300-1000 psi 4 hr. | 13.1 | 50 | 2 | 74 | 0 | t | 0.05 | 2,824.4 | 3.45 |
| 17 E | Rep 1.300-1000 psi 4 hr. | 14 | 50 | 2 | 14 | 2 | t | 0.05 | 50,000.0 | 4.70 |
| 18 F | Rep 1.300-1000 psi 4 hr. | 13.8 | 50 | 2 | 3 | 2 | t | 0.05 | 10,869.6 | 4.04 |

Note:
D, E & F were $CO_2$ flushed, heat sealed and stored @ 4° C. for 4 days in gas barrier packages.

Holding the samples for 4 hours did not significantly change the kill rate of E. coli 0157. A log 0.86 reduction was recorded in this experiment and a log 0.47 reduction was recorded on the experiment on the 16$^{th}$. However, storing the samples in about 100% substantially carbon dioxide at about 4° C. for 4 days did give a further log 2.83 kill Therefore the combined effect of treatment and storage gave an encouraging log 3.69 kill The meat on removal from the reactor after 4 hours was brown, but it bloomed within 10 minutes.

Conclusion

The data from this work has demonstrated that the treatment of meat with liquid carbon dioxide in the sub critical range alone had no practical significance in the destruction of E. coli 0157 on meat surfaces. However, in combination with The data is provided in TABLES 4 and 5 below. In TABLE 4 an approximate 1 log bacteria reduction is indicated in lines 21B when compared with the Control in line 19 and also an approximate 1 log bacteria reduction is indicated in lines 22C and 23D when compared with the Control in line 19. In TABLE 5 an approximate 2 log bacteria reduction is indicated in line 26B when compared with the Control in line 24. The treatment to Replicates shown in lines 25A and 26B is described in the first line above the tabulated data, wherein the replicates were exposed to supercritical phase carbon dioxide at 3000 psi atmosphere and 36° C.

Experiment 4: Meat Normal flora exposed to $CO_2$ in a supercritical fluid extractor (5 min). Pepmaster GA (Suprex Corporation)

TABLE 4

| SAMPLE # | SAMPLE DESCRIPTION | Weight of Sample | Vol. of Diluent | Plates # | CFU in all plates | Dilution | Type of plate | Vol | CFU/g | Logs |
|---|---|---|---|---|---|---|---|---|---|---|
| 19 CTRL | Non treated | 2.88 | 10 | 2 | 97 | 4 | t | 0.05 | 33,680,555.6 | 7.53 |
| 20 A | 1470 psi @ 29° C. | 5.35 | 10 | 2 | 28 | 4 | t | 0.05 | 5,233,644.9 | 6.72 |
| 21 B | 1470 psi @ 29° C. | 4.20 | 10 | 2 | 40 | 4 | t | 0.05 | 9,523,809.5 | 6.98 |
| 22 C | 3000 psi @ 29° C. | 4.43 | 10 | 2 | 40 | 4 | t | 0.05 | 9,029,345.4 | 6.96 |
| 23 D | 3000 psi @ 29° C. | 4.85 | 10 | 2 | 25 | 4 | t | 0.05 | 5,154,639.2 | 6.71 |

Experiment 5: Meat Normal flora exposed to $CO_2$ in a supercritical fluid extractor (5 min). Pepmaster GA (Suprex Corporation)

TABLE 5

| SAMPLE # | SAMPLE DESCRIPTION | Weight of Sample | Vol. of Diluent | Plates # | CFU in all plates | Dilution | Type of plate | Vol | CFU/g | Logs |
|---|---|---|---|---|---|---|---|---|---|---|
| 24 CTRL | Non treated | 4.50 | 20 | 2 | 51 | 4 | t | 0.05 | 22,666,666.7 | 7.36 |
| 25 A | 3000 psi @ 36° C. | 4.00 | 20 | 2 | 33 | 2 | t | 0.05 | 165,000.00 | 5.22 |
| 26 B | 3000 psi @ 36° C. | 3.80 | 20 | 2 | 133 | 2 | t | 0.05 | 700,000.0 | 5.85 |

The control before testing contained log 7.36 bacteria and after the test a log 5.53 bacteria. Therefore, there was a log 1.83 reduction. There was an approximate log 5 kill with liquid carbon dioxide and a log 1.83 kill with carbon dioxide in the supercritical region.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for inactivating microorganisms on food goods, comprising:
   (a) introducing food goods and carbon dioxide within an apparatus, wherein the apparatus comprises a chamber with a piston disposed in a sealing manner within the chamber, wherein the piston reciprocates from a proximal position to a distal position to pressurize a chamber space and reciprocates from the distal position to the proximal position to depressurize the chamber space, and wherein the goods and carbon dioxide are located within the chamber space;
   (b) providing water at the surfaces of the food goods in the apparatus;
   (c) agitating the food goods within the chamber space;
   (d) raising a pressure within the chamber space to at or above a critical pressure of carbon dioxide by moving the piston from the proximal position to the distal position, which raises a temperature of the carbon dioxide to at or above a critical temperature of carbon dioxide;
   (e) reducing the pressure within the chamber space by moving the piston from the distal position to the proximal position which lowers the temperature of the carbon dioxide in contact with the water at the surfaces of the goods; and
   (f) subjecting the goods to steps (b), (c), (d), and (e) more than once to inactivate microorganisms.

2. The method of claim 1, wherein the water and carbon dioxide form carbonic acid having a pH less than 3.

3. The method of claim 1, wherein the water and carbon dioxide form carbonic acid having a pH less than 4.

4. The method of claim 1, wherein the water and carbon dioxide form carbonic acid having a pH less than 5.

5. The method of claim 1, further comprising applying ultrasonic energy to the goods to separate microorganisms from the goods.

6. The method of claim 1, wherein the apparatus comprises a second piston disposed in a sealing manner within the chamber, wherein the second piston reciprocates from a second proximal position to a second distal position to pressurize the chamber space in step (d), and reciprocates from the second distal position to the second proximal position to depressurize the chamber space in step (e).

7. The method of claim 6, wherein the pistons are horizontally opposed to each other.

8. The method of claim 1, wherein the pressure is raised to approximately 1100 psig in step(d), and the pressure is reduced to approximately 400 psig or greater in step (e).

9. The method of claim 1, wherein after inactivation of the microorganisms, contents present in the chamber space are removed by moving the piston laterally.

10. The method of claim 1, wherein the carbon dioxide in step (a) is a gas.

11. The method of claim 1, wherein the carbon dioxide in step (a) is a gas and pressurizes the chamber space to approximately 500 psig.

12. The method of claim 1, wherein the carbon dioxide in step (a) is a liquid.

13. The method of claim 1, wherein the carbon dioxide in step (a) is a liquid and pressurizes the chamber space to approximately 600 psig to 800 psig.

* * * * *

UNITED STATES PATENT AND TRADEMARK OFFICE
CERTIFICATE OF CORRECTION

PATENT NO. : 8,101,220 B2
APPLICATION NO. : 12/627931
DATED : January 24, 2012
INVENTOR(S) : A. J. M. Garwood It is certified that error appears in the above-identified patent and that said Letters Patent is hereby corrected as shown below:

Title Page, Item (73) Assignee: "SafeFresh Technologies, LLC, Mercer Islands, WA (US)" should read --SafeFresh Technologies, LLC, Mercer Island, WA (US)--

Signed and Sealed this
Twenty-third Day of October, 2012

David J. Kappos
*Director of the United States Patent and Trademark Office*